United States Patent
Oba et al.

(10) Patent No.: US 6,657,853 B2
(45) Date of Patent: Dec. 2, 2003

(54) INFORMATION PROCESSING APPARATUS

(75) Inventors: Haruo Oba, Kanagawa (JP); Hiroji Yoshino, Chiba (JP); Yoshimasa Hosono, Kanagawa (JP); Koji Nishimura, Tokyo (JP)

(73) Assignee: Sony Corporation, Tokyo (JP)

( * ) Notice: Subject to any disclaimer, the term of this patent is extended or adjusted under 35 U.S.C. 154(b) by 94 days.

(21) Appl. No.: 09/945,984

(22) Filed: Sep. 4, 2001

(65) Prior Publication Data

US 2002/0068985 A1 Jun. 6, 2002

(30) Foreign Application Priority Data

Sep. 5, 2000 (JP) ........................... 2000-268287
Sep. 5, 2000 (JP) ........................... 2000-268288

(51) Int. Cl.⁷ .............................................. G06F 1/16
(52) U.S. Cl. ................... 361/681; 361/680; 248/123.11; 206/320; 312/223.2
(58) Field of Search .................. 361/680, 681, 361/682–686, 725, 727, 728–730; 248/123.11, 276.1, 260.11, 291.1, 291.11, 292.13, 919–923, 485–487, 918; 206/320, 576; 400/713; 312/223.1, 223.2; 348/794; G06F 1/16

(56) References Cited

U.S. PATENT DOCUMENTS 5,673,169 A * 9/1997 Wicks ......................... 361/680
6,015,120 A * 1/2000 Sweere et al. ........... 248/123.11
6,219,228 B1 * 4/2001 Sun ............................. 361/683
6,430,037 B1 * 8/2002 Oba et al. .................... 361/680
6,480,372 B1 * 11/2002 Vong et al. .................. 361/680

FOREIGN PATENT DOCUMENTS

| JP | 411194714 A | * | 7/1999 | ............. G09F/9/00 |
| JP | 411219229 A | * | 8/1999 | ............. G06F/1/16 |
| JP | 0200035702 A | * | 12/2000 | ............. G06F/1/16 |

* cited by examiner

*Primary Examiner*—Michael Datskovskiy
(74) *Attorney, Agent, or Firm*—Frommer Lawrence & Haug LLP; William S. Frommer

(57) ABSTRACT

An information processing apparatus is disclosed which occupies a minimized space when it is not used. The information processing apparatus includes a stand including a base and a support arm extending uprightly from the base, a display unit supported for pivotal motion on the support arm, and a keyboard having a plurality of operation keys provided thereon. The support arm includes an upper arm portion and a lower arm portion. The upper arm portion has an upper pivotal fulcrum at an upper end portion thereof for supporting the display unit for pivotal motion, and the lower arm portion has a lower pivotal fulcrum provided at an upper end portion thereof for supporting the upper arm portion for pivotal motion. An accommodation space for accommodating the keyboard placed on the base is formed between the base of the stand and the display unit when the upper arm portion of the support arm is pivoted with respect to the lower arm portion and the display unit is pivoted with respect to the upper arm portion until the base is covered with the display unit.

14 Claims, 36 Drawing Sheets

F I G. 13
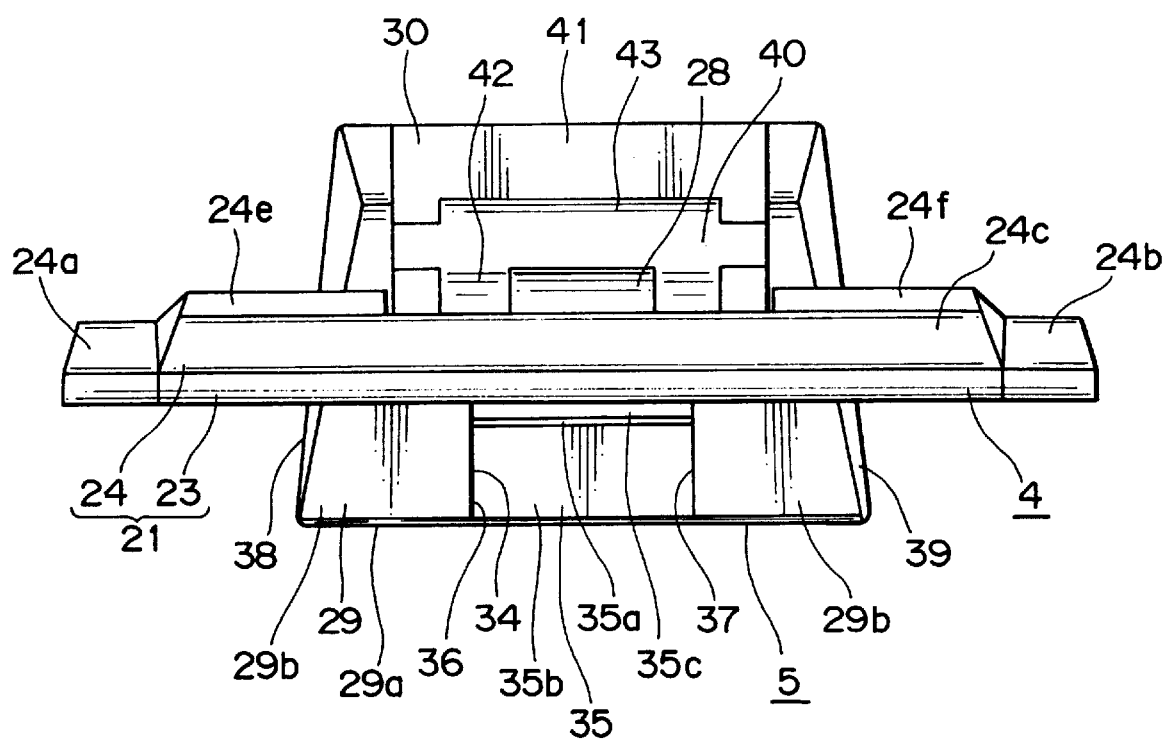

F I G. 15
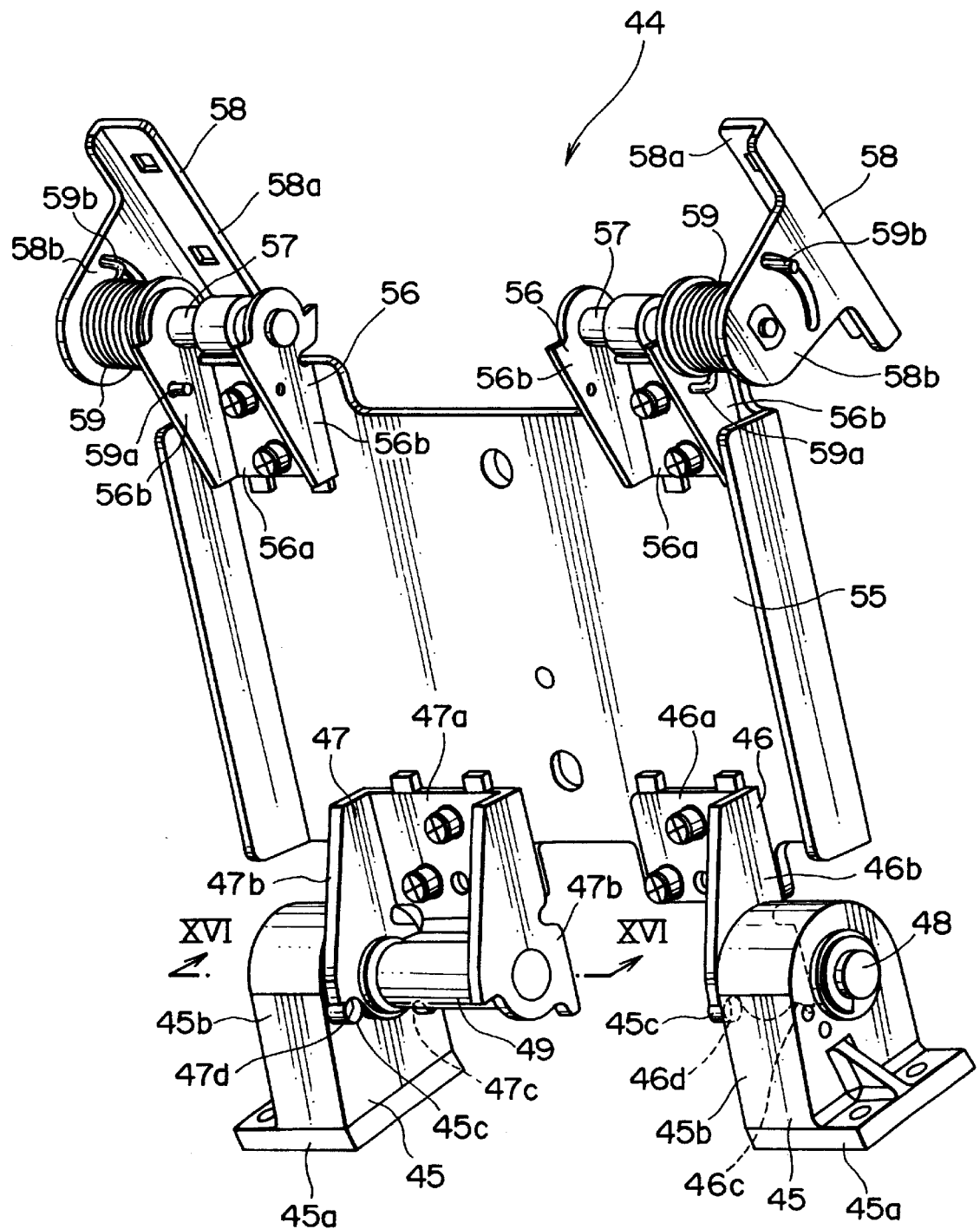

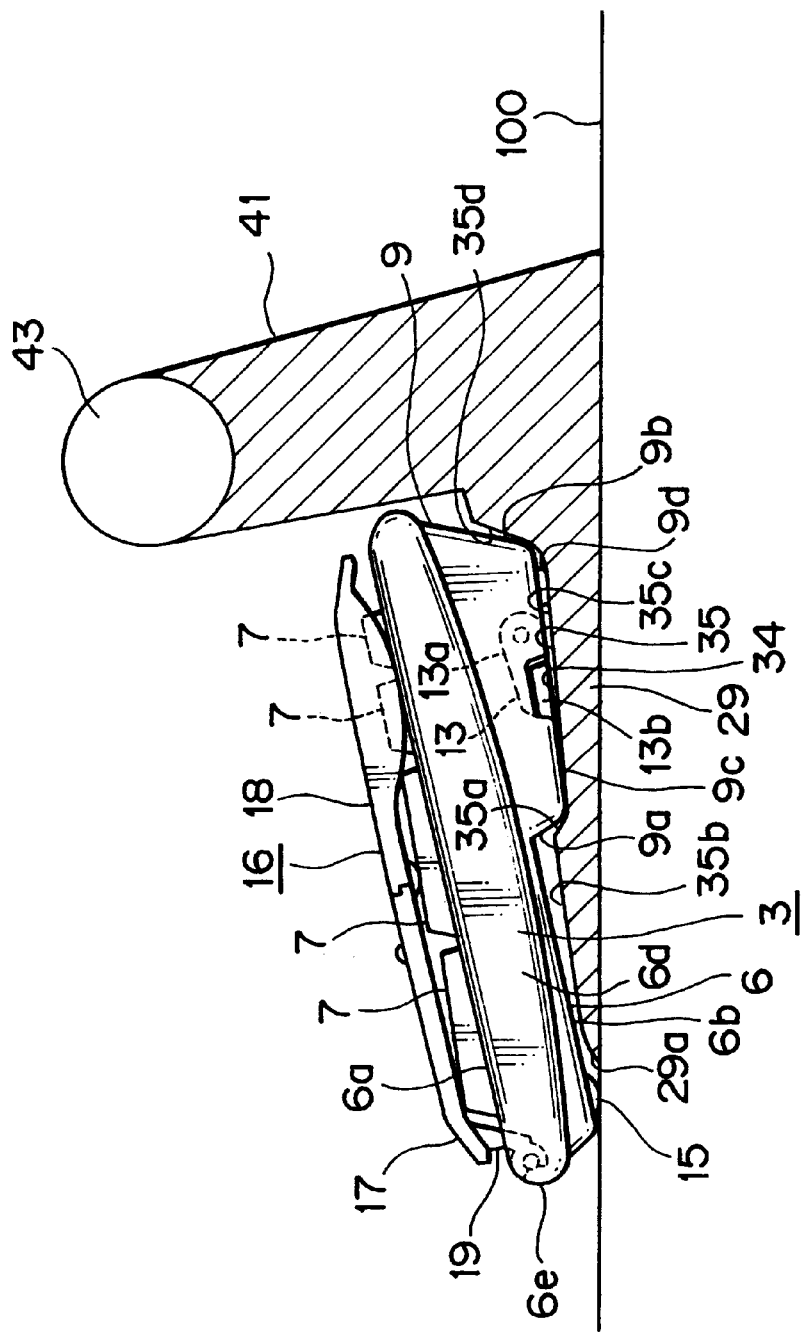

INFORMATION PROCESSING APPARATUS

BACKGROUND OF THE INVENTION

This invention relates to an information processing apparatus, and more particularly to an information processing apparatus which includes a keyboard and a display unit which is supported for pivotal motion on a stand.

An information processing apparatus is conventionally known which includes a keyboard having a plurality of operation keys provided thereon and a display unit having a display screen and supported for pivotal motion on a stand.

A conventional information processing apparatus of the type mentioned includes a base having a stand to be placed on a desk and a support arm mounted for pivotal motion on the base. A display unit is supported for pivotal motion at the upper end of the support arm. If the support arm is pivoted so as to be tilted forwardly with respect to the base and then the display unit is pivoted with respect to the support arm, then the display unit can be positioned in an inclined relationship such that a display screen thereof is directed substantially upwardly or obliquely forwardly upwards. In the state wherein the display unit is inclined in this manner, the user can, for example, use an annexed input pen to perform hand-written inputting or use such an annexed input pin and a keyboard to use both of hand-written inputting from the display screen and key inputting through operation keys to perform an inputting operation, an editing operation of inputted information and other necessary operations.

Where the display unit is inclined such that the display screen thereof is directed substantially upwardly or obliquely forwardly upwards in this manner, the user can perform an inputting operation and other necessary operations readily in a natural posture like a case wherein the user normally writes characters and so forth on a desk using a writing tool.

However, after the user performs its operation in a state wherein the display unit is inclined substantially upwardly or substantially obliquely upwards as described above, the user frequently interrupts or stops the operation while the state described above is maintained.

With the conventional information processing apparatus described above, however, when operation is to be interrupted or stopped in a state wherein the display unit is inclined, it cannot be avoided to leave the keyboard placed at a position other than the space occupied by the display unit. Therefore, when the information processing apparatus is not used, several components of the information processing apparatus including the keyboard and the display unit occupy a large space, which gives rises to a disadvantage that reduction in space cannot be achieved and the information apparatus occupies an unnecessary large area on a desk when it is intended to perform some other operation on the desk.

Not only where the display unit is inclined as described above, but such components of the information processing apparatus as the display unit and the keyboard individually occupy the space on the desk. Also this deteriorates the space efficiency similarly.

Further, if the keyboard does not include a keyboard cover, it is disadvantageous also in that foreign substances such as dust are liable to be admitted into the inside of the keyboard through the gaps between the operation keys and holes formed in the keyboard having the operation keys arranged therein.

SUMMARY OF THE INVENTION

It is an object of the present invention to provide an information processing apparatus which occupies a minimized space when it is not used.

In order to attain the object described above, according to the present invention, there is provided an information processing apparatus, comprising a stand including a base to be placed on a desk and a support arm extending uprightly from the base, a display unit having a display screen and supported for pivotal motion on the support arm of the stand, and a keyboard having a plurality of operation keys provided thereon, the support arm including an upper arm portion and a lower arm portion, the upper arm portion having an upper pivotal fulcrum at an upper end portion thereof for supporting the display unit for pivotal motion, the lower arm portion having a lower pivotal fulcrum provided at an upper end portion thereof for supporting the upper arm portion for pivotal motion, an accommodation space for accommodating the keyboard placed on the base being formed between the base of the stand and the display unit when the upper arm portion of the support arm is pivoted with respect to the lower arm portion around the lower pivotal fulcrum and the display unit is pivoted with respect to the upper arm portion around the upper pivotal fulcrum until the base is covered with the display unit.

With the information processing apparatus, when the upper arm portion of the support arm is pivoted with respect to the lower arm portion around the lower pivotal fulcrum and the display unit is pivoted with respect to the upper arm portion around the upper pivotal fulcrum until the base is covered with the display unit, the accommodation space in which the keyboard placed on the base can be accommodated is formed between the base of the stand and the display unit. Consequently, since the keyboard can be accommodated in the accommodation space when the keyboard is not used, the keyboard does not occupy an unnecessary space on the desk, and therefore, reduction of the space can be anticipated. Further, when the keyboard is not used, sticking of dust to the operation keys of the keyboard and admission of dust into the inside of the keyboard can be prevented.

Preferably, a keyboard cover is supported at a front end portion of the keyboard for pivotal motion between a covering position at which the keyboard cover covers over all or some of the operation keys of the keyboard and an uncovering position at which the keyboard cover does not cover all or some of the operation keys of the keyboard, and the keyboard and the keyboard cover can be accommodated in the accommodation space when the keyboard cover is in the covering position. With the information processing apparatus, when the keyboard is accommodated in the accommodation space, sticking of dust to the operation keys of the keyboard and admission of dust into the inside of the keyboard can be prevented further effectively.

Preferably, a keyboard cover is supported at a front end portion of the keyboard for pivotal motion between a covering position at which the keyboard cover covers over all or some of the operation keys of the keyboard and an uncovering position at which the keyboard cover does not cover all or some of the operation keys of the keyboard, and the keyboard and the keyboard cover can be accommodated in the accommodation space when the keyboard cover is in the uncovering position. With the information processing apparatus, also the keyboard cover which does not cover over the operation keys can be accommodated in the accommodation space, and consequently, augmentation of the convenience of use of the keyboard can be anticipated.

Preferably, when the accommodation space is formed, an end portion of a face of the display unit opposite to a face on which the display screen is provided contacts with the desk and part of the face of the display unit opposite to the face on which the display screen is provided contacts face-by-face with the upper arm portion of the support arm. With the information processing apparatus, the display unit can be disposed stably while preventing otherwise possible play of the display unit.

Preferably, when the upper arm portion is not pivoted with respect to the lower arm portion and therefore the upper arm portion and the lower arm portion extend along a line and the display screen of the display unit is directed substantially forwardly, an accommodation space for accommodating the keyboard is formed between a lower end of the display unit and the base of the stand. With the information processing apparatus, where the keyboard is placed on the base when the information processing apparatus is not used, the keyboard does not occupy an unnecessary area of the desk, and consequently, reduction of the space can be anticipated.

Preferably, a keyboard cover is supported at a front end portion of the keyboard for pivotal motion between a covering position at which the keyboard cover covers over all or some of the operation keys of the keyboard and an uncovering position at which the keyboard cover does not cover all or some of the operation keys of the keyboard, and when the accommodation space is formed, the keyboard with the operation keys covered with the keyboard cover can be disposed in contact with or in the proximity of the display unit forwardly of the display unit, whereas, when the keyboard is disposed forwardly of the display unit, a face of the display unit on which the display screen is provided and an upper face of the keyboard cover are positioned in a substantially same plane. With the information processing apparatus, the entire display unit and keyboard cover can be used as a hand receiving table. The use of the hand receiving table reduces the fatigue to the arms of the user, and therefore, the user can perform its operation easily and augmentation of the operation efficiency and augmentation of the convenience of use can be anticipated.

Further, since the face of the display unit on which the display screen is provided and the upper face of the keyboard cover are positioned in a substantially same plane, the display unit and the keyboard on which the keyboard cover is supported are disposed unitarily and provide a good appearance.

Preferably, a keyboard cover is supported at a front end portion of the keyboard for pivotal motion between a covering position at which the keyboard cover covers over all or some of the operation keys of the keyboard and an uncovering position at which the keyboard cover does not cover all or some of the operation keys of the keyboard, and when the accommodation space is formed, the keyboard with the operation keys uncovered can be disposed in contact with or in the proximity of the display unit forwardly of the display unit, whereas, when the keyboard with the operation keys uncovered is disposed forwardly of the display unit, a face of the display unit on which the display screen is provided, an upper face of the keyboard and an upper face of the keyboard cover are positioned in a substantially same plane. With the information processing apparatus, the entire display unit and keyboard cover can be used as a hand receiving table. The use of the hand receiving table reduces the fatigue to the arms of the user, and therefore, the user can perform its operation easily and augmentation of the operation efficiency and augmentation of the convenience of use can be anticipated.

Further, since the face of the display unit on which the display screen is provided, the upper face of the keyboard and the upper face of the keyboard cover are positioned in a substantially same plane, the display unit and the keyboard on which the keyboard cover is supported are disposed unitarily and provide a good appearance.

Preferably, a one-way clutch mechanism which exerts, when the upper arm portion is pivoted with respect to the lower arm portion in a direction in which the display unit is moved down, a load to the moving down force, but does not exert, when the upper arm portion is pivoted with respect to the lower arm portion in another direction in which the display unit is moved up, a load to the moving up force, is used for the lower pivotal fulcrum. With the information processing apparatus, when the user tries to move up the display unit, it is not acted upon by a load other than the weight of the display unit and the upper arm portion. Therefore, the display unit can be lifted readily with weak force, and consequently, augmentation of the convenience of use of the information processing apparatus can be anticipated.

Further, the display unit can be stopped at an arbitrary position. Therefore, the user can use the display unit at a suitable position in accordance with the necessity, and consequently, augmentation of the convenience of use can be anticipated.

Preferably, the keyboard has a positioning portion at a lower face portion thereof and is movable in a leftward and rightward direction on the base while the display unit covers over the base, and the base of the stand has a position restriction portion for being engaged, when the keyboard is moved in the leftward or rightward direction with respect to the base, by the positioning portion of the keyboard to restrict the position of the keyboard in the leftward and rightward direction. With the information processing apparatus, when some other inputting means other than the keyboard such as an inputting pen is used for inputting, some of the operation keys disposed on the keyboard can be exposed from the arrangement space and used for inputting. Consequently, efficient operation can be performed within a necessary but minimum space, and augmentation of the convenience of use of the information processing apparatus can be anticipated.

When both of the keyboard and some other inputting means are used for inputting, the keyboard and the display unit are disposed near to the user. Consequently, significant augmentation of the convenience of use can be anticipated.

Further, only such operation keys as ten keys need not be provided on a side portion (on a screen frame) of the display screen of the display unit, and consequently, an increase of the size of the display unit can be prevented.

The positioning portion of the keyboard may be formed as a projection which projects from the lower face portion, and the position restriction portion of the base may be formed as a recess into which the projection can be inserted. With the information processing apparatus, those portions provided originally in the information processing apparatus are used as the positioning portion and the position restriction portion, and accordingly, a special positioning projection or positioning restriction element need not be provided on the keyboard or the stand. Consequently, the keyboard can be positioned readily without increasing the production cost.

Preferably, the positioning portion is provided at each of the left and right ends of the lower end portion of the keyboard. With the information processing apparatus, since the positioning projections are provided separately from each other at the opposite left and right end portions of the bottom wall of the keyboard, both of the position at which the keyboard projects rightwardly from the accommodation space and the position at which the keyboard projects leftwardly from the accommodation space can be set, which expands the number of different forms of use of the information processing apparatus. Consequently, significant augmentation of the convenience of use can be anticipated.

Preferably, the recess of the base has an offset portion formed therein in such a manner as to extend in the leftward and rightward direction and is formed such that a portion of the recess rearwardly of the offset portion has a bottom shallower than a bottom of another portion of the recess which is forwardly of the offset portion. With the information processing apparatus, the user can recognize with certainty that the positioning projection has been inserted into the deeper portion of the recess.

Preferably, a control circuit board for controlling a signal to be outputted upon operation of the operation keys is disposed in the inside of at least one of the positioning portions. The disposition of the control circuit board allows the keyboard to be designed with a reduced thickness.

Preferably, an accommodation recess is formed in each of the positioning portions on the opposite sides of the keyboard, and a support foot for being accommodated into the accommodation recess is supported for pivotal motion on each of the positioning portions, the keyboard being held in a horizontal state in the leftward and rightward direction by pulling out, while one of the positioning portions is inserted in the recess of the position restriction portion, the support foot from the accommodation recess provided on the other one of the positioning portions and erecting the support foot on the desk. With the information processing apparatus, the keyboard can be held in a horizontal state very readily.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 9, 10, 11, 12 and 13 are a right side elevational view, a left side elevational view, a front elevational view, a rear elevational view and a top plan view, respectively, showing a stand and a display unit of the information processing apparatus of FIG. 1;

FIG. 15 is a perspective view showing a pivotal support mechanism of the information processing apparatus of FIG. 1;

FIG. 37 is a similar view but showing the information processing apparatus of FIG. 1 in a state wherein the positioning projection of the keyboard is inserted in the insertion recess of the base.

DESCRIPTION OF THE PREFERRED EMBODIMENT

Figure 1:
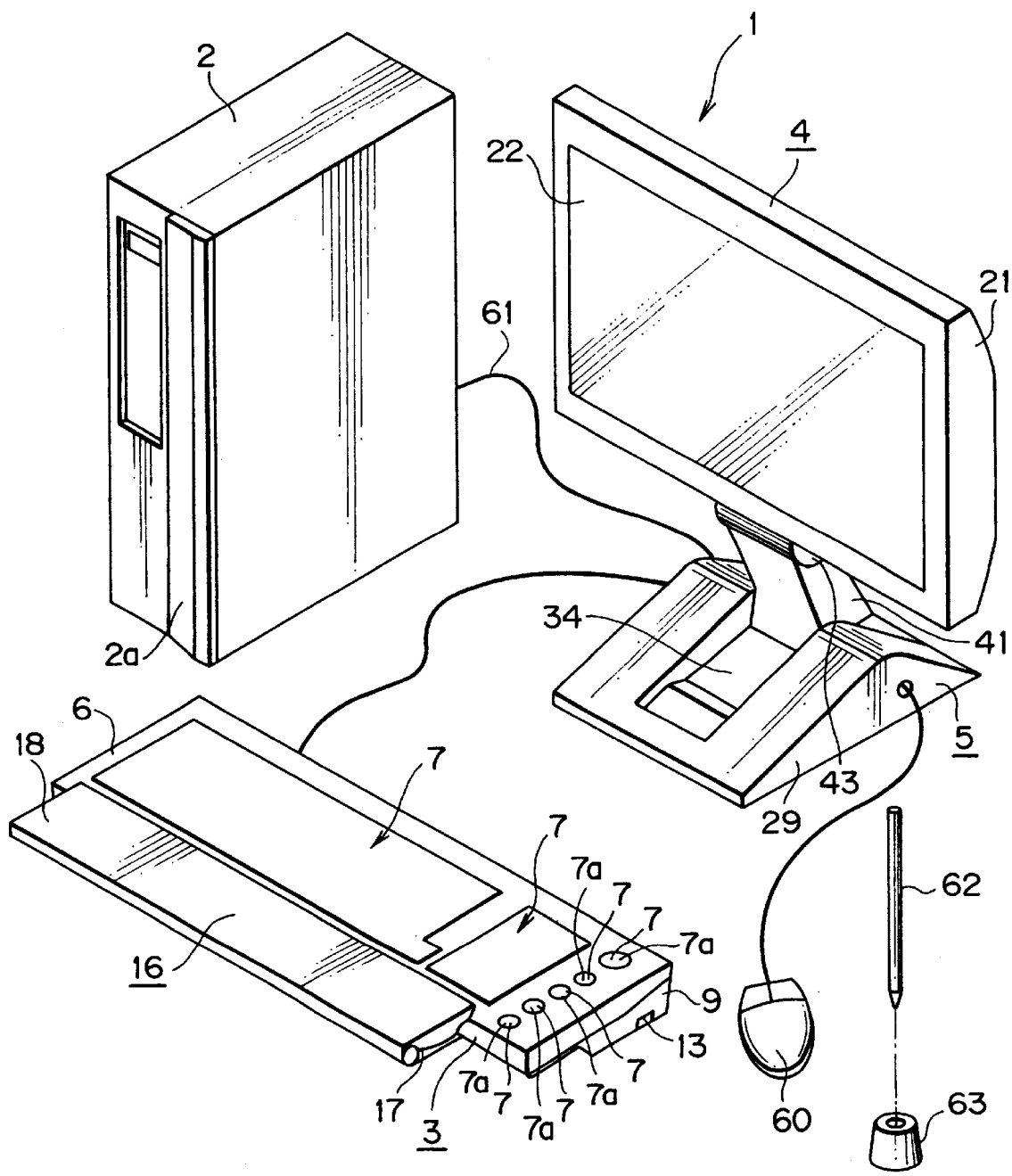
FIG. 1 is a schematic perspective view showing an entire configuration of an information processing apparatus to which the present invention is applied.

Referring first to FIG. 1, there is shown an information processing apparatus to which the present invention is applied. The information processing apparatus is generally denoted at 1 and includes an apparatus body 2, a keyboard 3, a display unit 4, and a stand 5 for supporting the display unit 4.

The apparatus body 2 is of the vertical type vertically elongated as viewed from the front and has an opening/closing lid 2a provided on the front thereof. If the opening/closing lid 2a is opened, then a predetermined recording medium can be inserted into a slot not shown of the apparatus body 2. Such a processing element as a central processing unit (CPU) is provided in the apparatus body 2 and performs various processes for a signal inputted by operation of operation keys or the like of the keyboard 3 which are hereinafter described.

Figure 2:
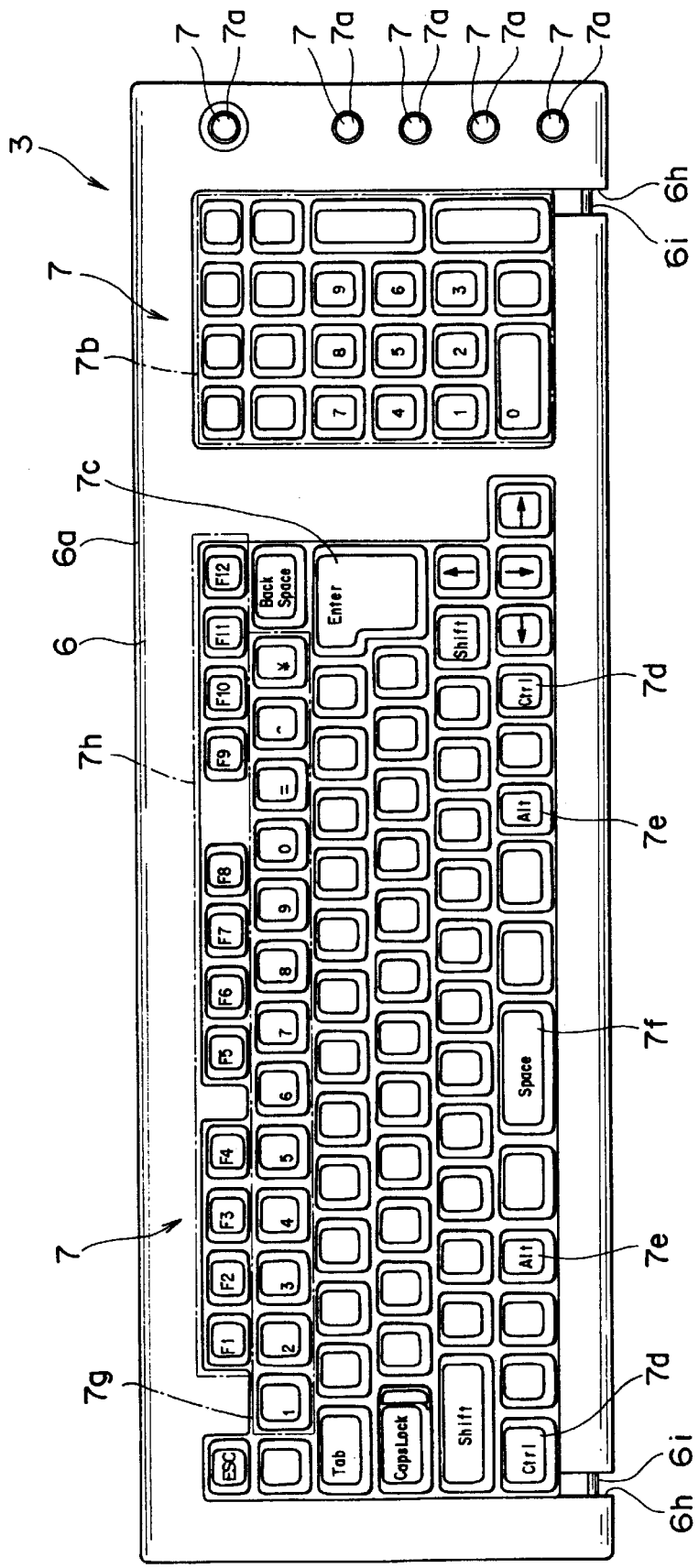
FIG. 2 is a top plan view showing a keyboard of the information processing apparatus of FIG. 1 with a keyboard cover removed.

Referring now to FIG. 2, the keyboard 3 includes a housing 6 having a horizontally elongated substantially rectangular shape and a plurality of predetermined operation keys 7 disposed on the housing 6. Key arrangement holes are formed in a top wall 6a of the housing 6, and the operation keys 7 are disposed in the key arrangement holes.

A plurality of hot keys 7a having functions as shortcut keys to Internet mail software and so froth are disposed at a right end portion of the top wall 6a of the housing 6. Ten keys 7b for inputting numerical values and so forth are disposed at a portion of the top wall 6a of the housing 6 on the left side of the hot keys 7a, and an enter key 7c is disposed at a position on the left side of the ten keys 7b.

Control keys 7d, alt keys 7e, a space key 7f and so forth are arranged in the frontmost one of rows on the left side of the ten keys 7b. Further, numeral keys 7g by which numerical values and so forth can be inputted are disposed in the second rearmost row on the left side of the ten keys 7b, and function keys 7h are disposed in the rearmost row in a juxtaposed relationship to the numeral keys 7g. The arrangement of the function keys 7h in a juxtaposed relationship to the numeral keys 7g in this manner is effective to reduce the depthwise dimension of the keyboard 3.

Figure 3:
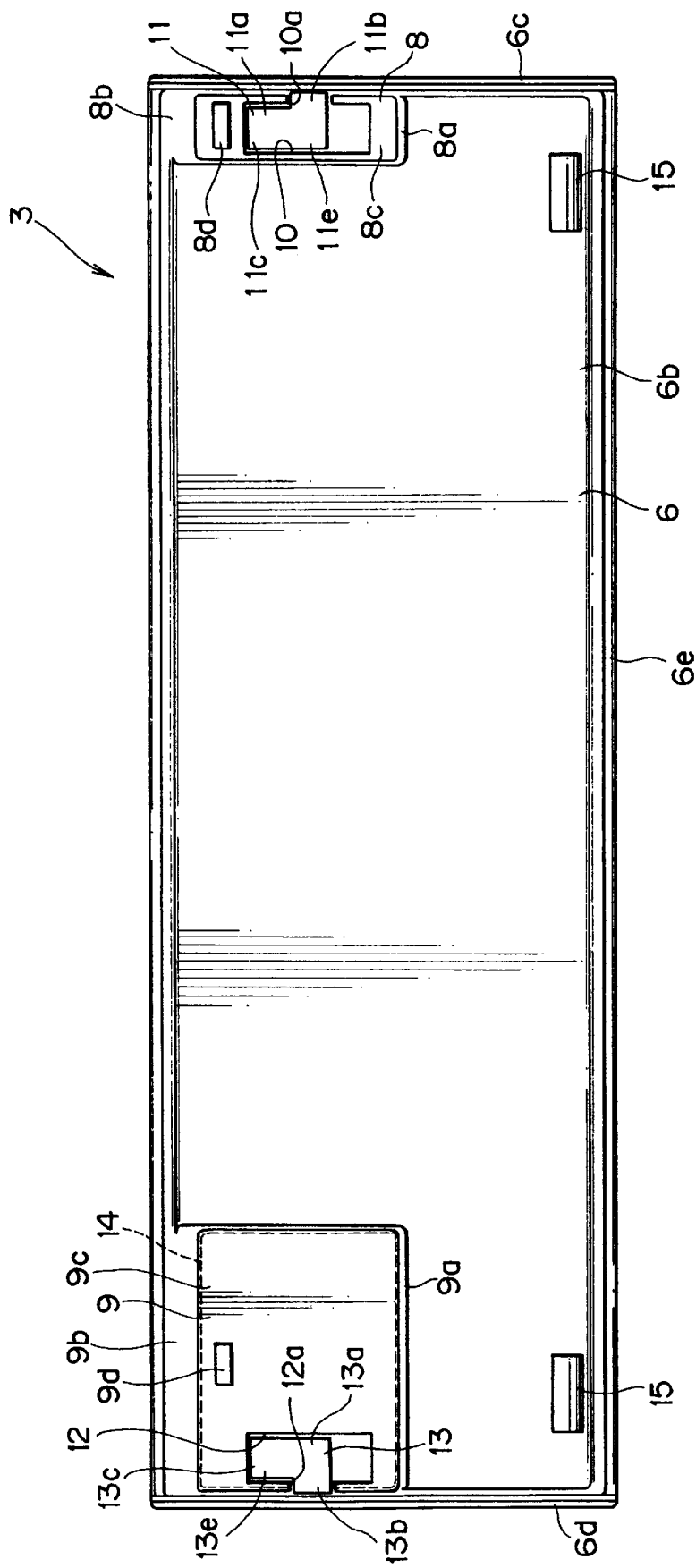
FIG. 3 is a bottom plan view of the keyboard of FIG. 2.

Referring now to FIG. 3, a pair of positioning projections 8 and 9 are provided at the opposite left and right end portions at a rear end portion of a bottom wall 6b of the housing 6. The positioning projections 8 and 9 serve as feet when the keyboard 3 is placed on a desk 100 (FIG. 5) or the like. The positioning projections 8 and 9 project by an equal projection amount or extent from the bottom wall 6b of the housing 6.

Figure 5:
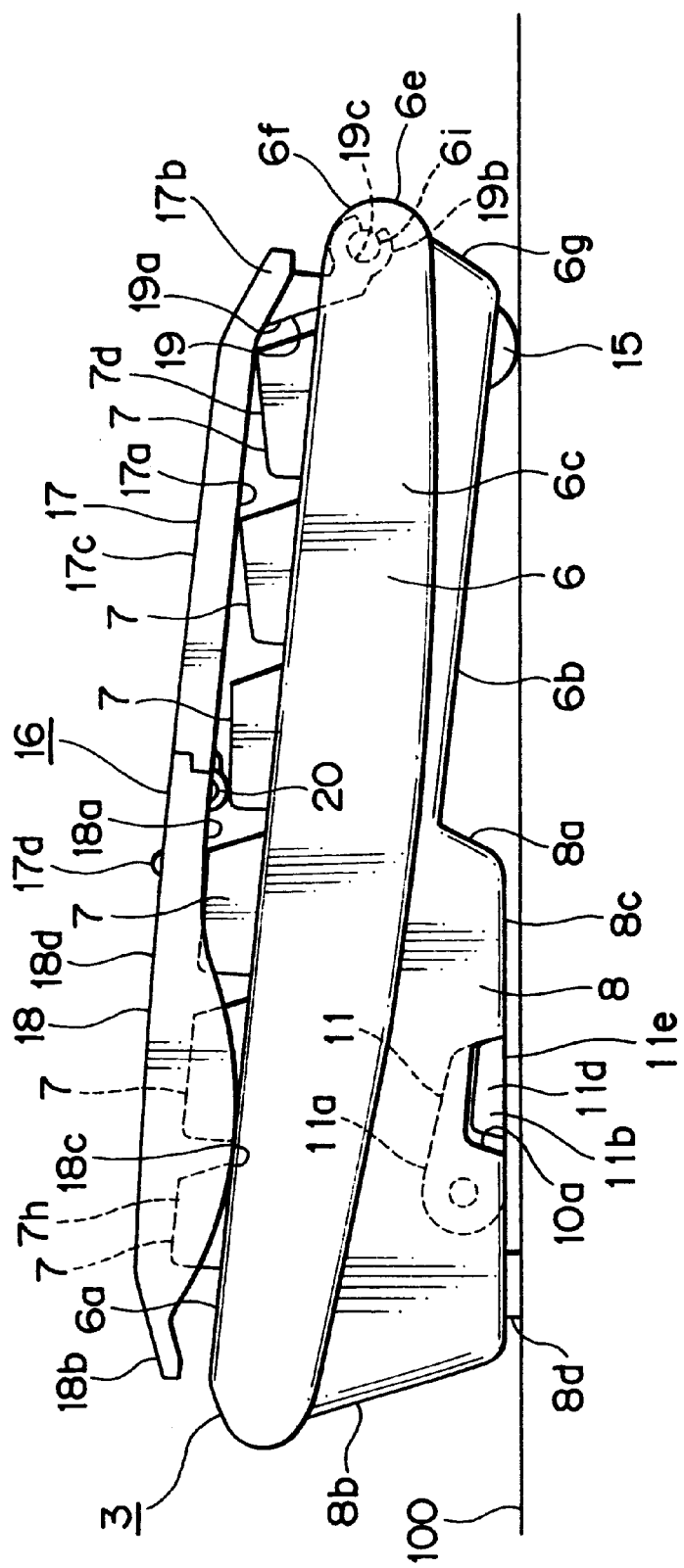
FIG. 5 is a left side elevational view of the keyboard of FIG. 2 in a state wherein the operation keys are covered with the keyboard cover.

The positioning projection 8 positioned on the left side has a width in the leftward and rightward direction smaller than that of the other positioning projection 9 and has a vertically elongated substantially rectangular shape (refer to FIG. 3). The positioning projection 8 has a front face 8a and a rear face 8b formed as inclined faces which are displaced toward each other downwardly as seen in FIG. 5. A rear seat 8d formed from a flexible material such as, for example, rubber is adhered to a rear end portion of a bottom face 8c of the positioning projection 8 as seen in FIG. 3.

Figure 8:
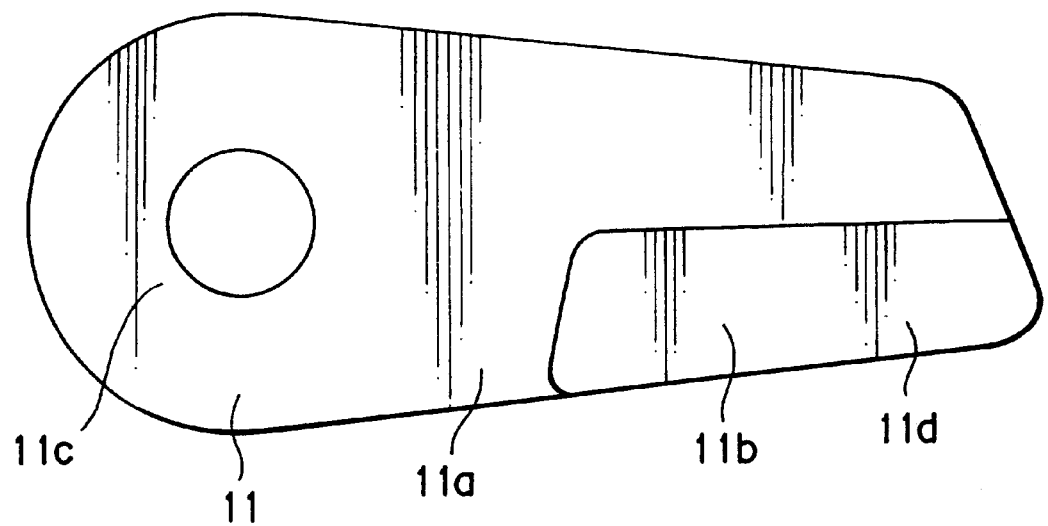
FIG. 8 is an enlarged side elevational view of one of the support feet shown in FIG. 7.

An accommodation recess 10 is formed at a position of the positioning projection 8 forwardly of the rear seat 8d as seen in FIG. 3. The accommodation recess 10 is open downwardly and is open, at a front end portion thereof, sidewardly, that is, at a left side face 6c of the housing 6 through a communicating portion 10a. A support foot 11 is supported for pivotal motion on the positioning projection 8 as seen in FIGS. 3, 5 and 8.

The support foot 11 has a main portion 11a and a pulling out projection 11b formed integrally with the main portion 11a and extending leftwardly from one end portion of the main portion 11a. The support foot 11 is supported for pivotal motion around a base end portion 11c of the main portion 11a accommodated at a rear end portion of the accommodation recess 10. When the support foot 11 is accommodated in the accommodation recess 10, the pulling out projection 11b is disposed in the communicating portion 10a and a left side face 11d of the pulling out projection 11b is positioned substantially in the same plane as the left side face 6c of the housing 6 or projecting a little leftwardly from the left side face 6c such that the left side face 11d is exposed to the left side of the keyboard 3. In this state, a lower face 11e of the support foot 11 is positioned on the same plane as the bottom face 8c of the positioning projection 8 as seen in FIG. 5.

Figure 6:
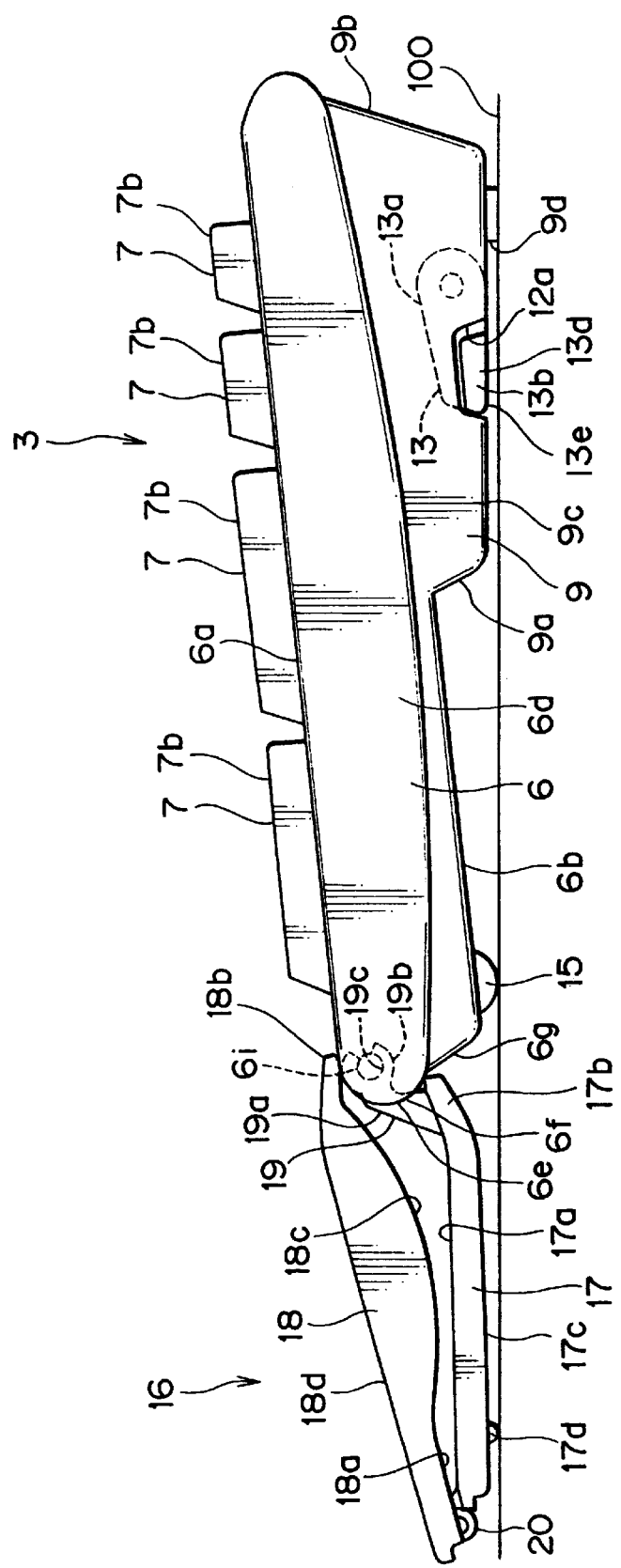
FIG. 6 is a right side elevational view of the keyboard of FIG. 2 in another state wherein the operation keys are uncovered.
Figure 7:
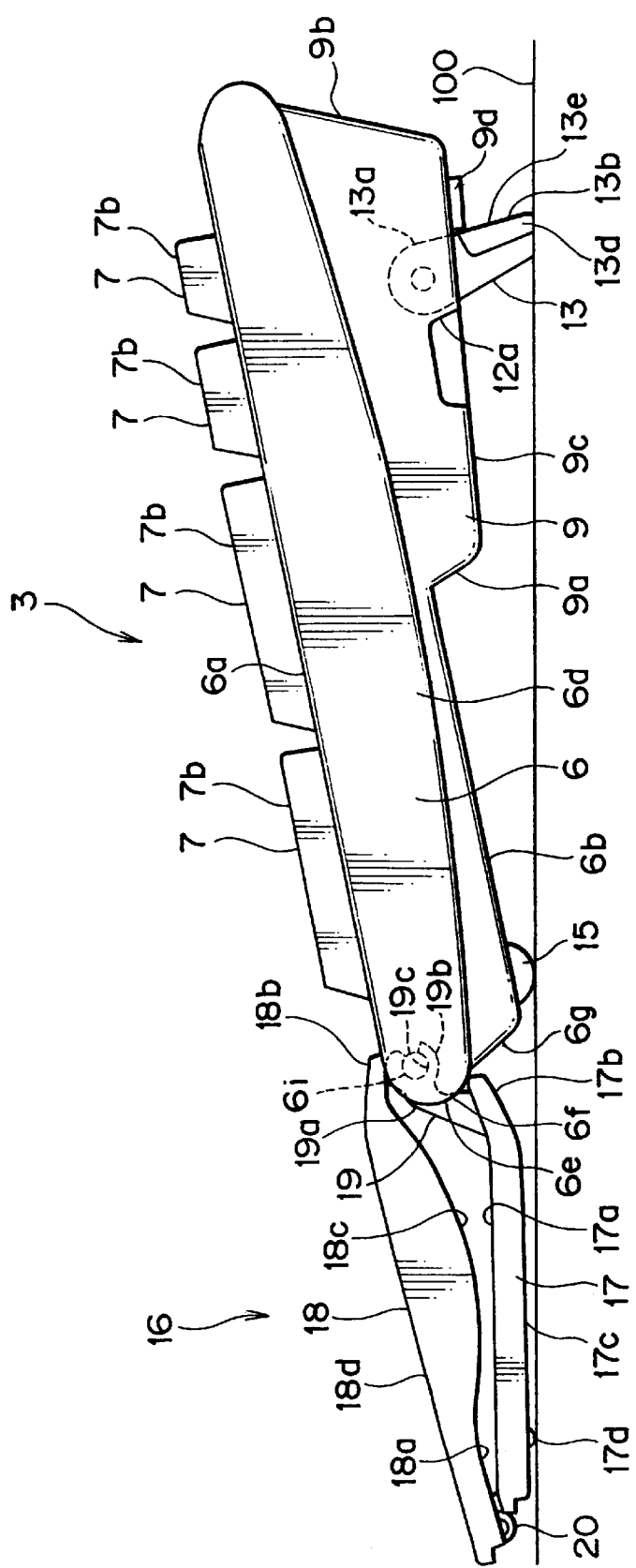
FIG. 7 is a right side elevational view of the keyboard of FIG. 2 in a state wherein the operation keys are uncovered and support feet are pulled out.

The positioning projection 9 positioned on the right side has a length in the forward and backward direction equal to that of the other positioning projection 8 and has a vertically elongated substantially rectangular shape a seen in FIG. 3. The positioning projection 9 has a front face 9a and a rear face 9b formed as inclined faces which are displaced toward each other downwardly as seen in FIGS. 6 and 7. The inclination angles of the front face 9a and the rear face 9b are equal to those of the front face 8a and the rear face 8b of the positioning projection 8, respectively. A rear seat 9d formed from a flexible material such as, for example, rubber is adhered to a rear end portion of a bottom face 9c of the positioning projection 9 similarly to the bottom face 8c of the positioning projection 8 as seen in FIG. 3.

An accommodation recess 12 is formed at a position of the positioning projection 9 corresponding to the position at which the accommodation recess 10 of the positioning projection 8 is formed as seen in FIG. 3. The accommodation recess 12 is open downwardly and is open, at a front half thereof, sidewardly, that is, at a right side face 6d of the housing 6 through a communicating portion 12a. A support foot 13 is supported for pivotal motion on the positioning projection 9 as seen in FIGS. 3, 6 and 7.

The support foot 13 has a main portion 13a and a pulling out projection 13b formed integrally with the main portion 13a and extending rightwardly from one end portion of the main portion 13a. The support foot 13 is supported for pivotal motion around a base end portion 13c of the main portion 13a accommodated at a rear end portion of the accommodation recess 12. When the support foot 13 is accommodated in the accommodation recess 12, the pulling out projection 13b is disposed in the communicating portion 12a and a right side face 13d of the pulling out projection 13b is positioned substantially in the same plane as the right side face 6d of the housing 6 or projecting a little rightwardly from the right side face 6d such that the right side face 13d of the support foot 13 is exposed to the right side of the keyboard 3. In this state, a lower face 13e of the support foot 13 is positioned on the same plane as the bottom face 9c of the positioning projection 9 as seen in FIG. 6.

When the support feet 11 and 13 are accommodated in the accommodation recesses 10 and 12 in such a manner as described above, respectively, the pulling out projections 11b and 13b are disposed in the communicating portions 10a and 12a, respectively, and the left side face 11d of the support foot 11 and the right side face 13d of the support foot 13 are exposed to the opposite sides of the keyboard 3. Accordingly, the user can pull out the support foot 11 or 13 accommodated in the accommodation recess 10 or 12 by pivoting the support foot 11 or 13 while the left side face 11d or the right side face 13d is held inwardly with its finger. Therefore, the support feet 11 and 13 can be pulled out from the accommodation recesses 10 and 12, respectively, without reversing the keyboard 3, thereby achieving augmentation of the convenience of use of the keyboard 3.

If the keyboard 3 is placed on the desk 100 while the support feet 11 and 13 are accommodated in the accommodation recesses 10 and 12, respectively, then it is inclined forwardly downwards moderately as seen in FIGS. 5 and 6. On the other hand, if the keyboard 3 is placed on the desk 100 while both of the support feet 11 and 13 are pulled out, then it is inclined forwardly downwards with a greater inclination angle than that where the keyboard 3 is placed on the desk 100 with the support feet 11 and 13 accommodated in the accommodation recesses 10 and 12, respectively.

A control circuit board 14 for controlling various signals to be outputted when the operation keys 7 are operated is disposed in the inside of the positioning projection 9 as seen in FIG. 3. Accordingly, since the control circuit board 14 is not disposed in the inside of the housing 6 other than the positioning projections 8 and 9, the keyboard 3 can be formed with a thickness reduced as much.

A pair of front seats 15 are adhered to the opposite left and right end portions of a front end portion of the bottom wall 6b of the housing 6 as seen in FIG. 3. The front seats 15 are formed from a rubber material or the like similar to that of the rear seats 8d and 9d adhered to the positioning projections 8 and 9, respectively. The front seats 15 have a semicircular shape projecting downwardly as viewed from sidewardly and normally contact with the desk 100 irrespective of the inclination angle of the keyboard 3 as seen in FIGS. 5 to 7.

When the support feet 11 and 13 are accommodated in the accommodation recesses 10 and 12, respectively, the keyboard 3 is supported at the four points thereof including the front seats 15 and the rear seats 8d and 9d on the desk 100 as seen in FIGS. 5 and 6. On the other hand, when the support feet 11 and 13 are pulled out from the accommodation recesses 10 and 12, respectively, the keyboard 3 is supported at the four points thereof including the front seats 15 and the support feet 11 and 13 on the desk 100 as seen in FIG. 7. Accordingly, the keyboard 3 is placed normally stably on the desk 100. Further, since the bottom wall 6b of the housing 6 and the bottom faces 8c and 9c of the positioning projections 8 and 9 do not contact directly with the top face of the desk 100 at all, the housing 6 can be prevented from being abraded or damaged.

The housing 6 has a front wall 6e formed such that an upper portion 6f thereof is formed in a substantially semicircular shape which is convex forwardly as viewed from sidewardly and a lower portion 6g contiguous to the upper portion 6f is formed as an inclined portion which is displaced downwardly rearwards as seen in FIGS. 5 to 7.

A pair of forwardly open support recesses 6h are formed at portions rather near to the left and right ends of a front end portion of the housing 6, and a support shaft 6i extends in and through each of the support recesses 6h as seen in FIG. 3. A keyboard cover 16 is supported for pivotal motion on the support shafts 6i as seen in FIGS. 4 to 7.

The keyboard cover 16 is formed as a substantially rectangular flat plate having a size sufficient to cover over all of the operation keys 7 disposed on the keyboard 3 except the hot keys 7a. The keyboard cover 16 has a first cover member 17 and a second cover member 18. A pair of supported projections 19 are formed in a leftwardly and rightwardly spaced relationship from each other integrally at an end portion 17b of an inner face 17a of the first cover member 17. The other end portion of the first cover member 17 is connected for pivotal motion to an end portion of the second cover member 18 by a hinge fulcrum 20.

Figure 4:
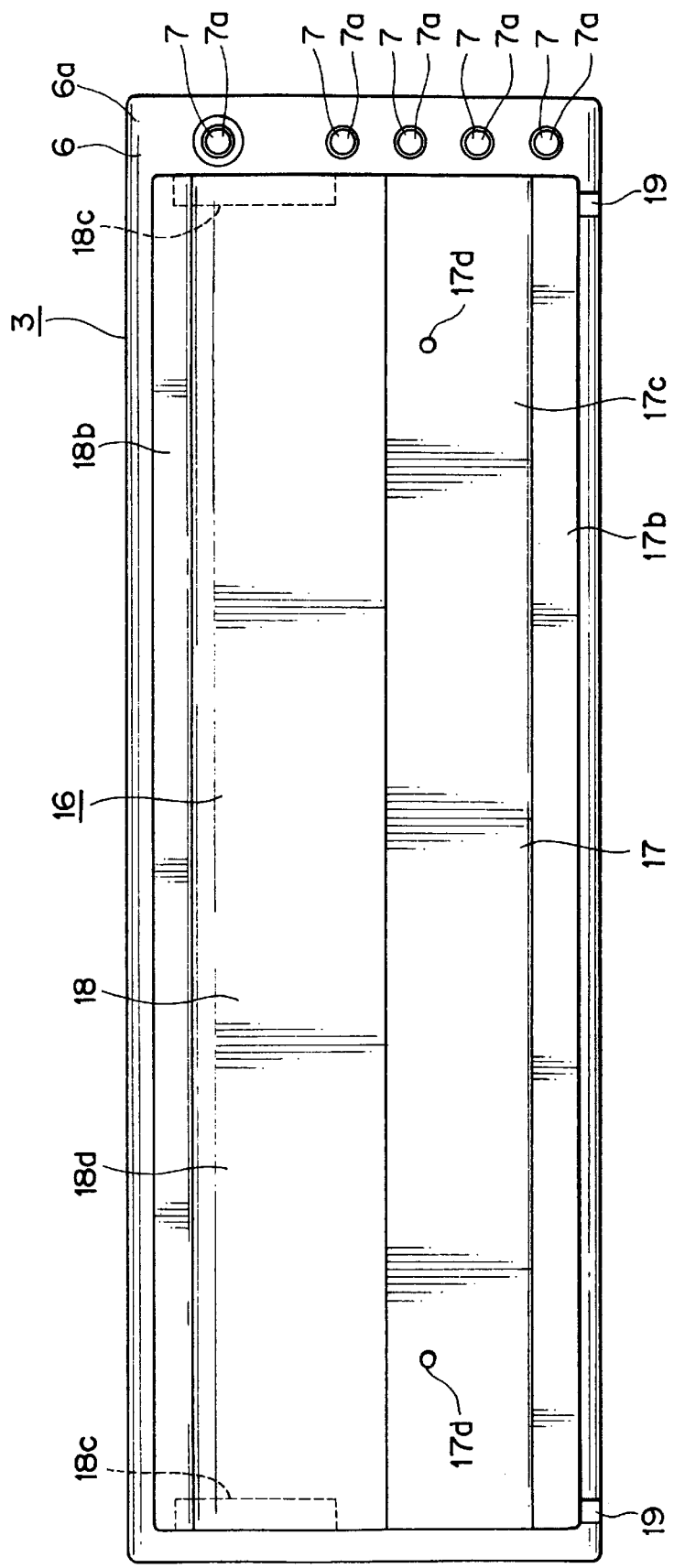
FIG. 4 is a top plan view of the keyboard of FIG. 2 in a state wherein operation keys of the keyboard are covered with the keyboard cover.

The first cover member 17 is inclined such that the end portion 17b, that is, a front end portion, thereof is displaced forwardly downwards when it covers over the operation keys 7. A pair of small projections 17d having a small semispherical shape are formed in a leftwardly and rightwardly spaced relationship from each other at positions rather near to the hinge fulcrum 20 of an outer face 17c of the first cover member 17. The hinge fulcrum 20 is provided on the inner face 17a of the first cover member 17 and an inner face 18a of the second cover member 18. Accordingly, in any of a state wherein the keyboard cover 16 covers over the operation keys 7 as seen in FIGS. 4 and 5 and another state wherein the keyboard cover 16 is folded as hereinafter described as seen in FIGS. 6 and 7, the hinge fulcrum 20 cannot be visually observed by the user. Therefore, the keyboard 3 has a good appearance in this regard.

The second cover member 18 is inclined such that a free end portion 18b, that is, a rear end portion, thereof is displaced rearwardly downwardly when it covers over the operation keys 7. A pair of support portions 18c are integrally formed at the opposite left and right end portions of the second cover member 18 and project from the inner face 18a. The support portions 18c have a lower face formed as a moderate curved face. When the keyboard cover 16 covers over the operation keys 7, the support portions 18c contact with portions rather near to the left end and the right end of the top wall 6a of the housing 6, respectively, as seen in FIG. 5. Accordingly, the hot keys 7a disposed at the right end portion of the housing 6 are not covered with the keyboard cover 16.

When the keyboard cover 16 covers over the operation keys 7, since the end portion 17b of the first cover member 17 is inclined so as to be displaced forwardly downwards and the free end portion 18b of the second cover member 18 is inclined so as to be displaced rearwardly downwards as described hereinabove, small gaps are produced between the top wall 6a of the housing 6 and a lower end of the end portion 17b and a lower end of the free end portion 18b. This raises the dust-proof function of the keyboard cover 16.

Each of the supported projections 19 has a base end portion 19a contiguous to the first cover member 17 and an free end portion 19b bent at a predetermined angle with respect to the base end portion 19a and having a supported slit 19c formed thereon as seen in FIGS. 5 to 7. The support shafts 6i provided at the front end portion of the housing 6 are inserted in the supported slits 19c to support the keyboard cover 16 for pivotal motion on the housing 6.

If the keyboard cover 16 is pivoted so as to be positioned forwardly of the housing 6, then the operation keys 7 having been covered with the keyboard cover 16 are uncovered so that all of the operation keys 7 can be operated. Then, if the first cover member 17 and the second cover member 18 are pivoted around the hinge fulcrum 20 so as to be folded together, then the keyboard cover 16 can be used as a hand receiving table (refer to FIGS. 6 and 7).

In particular, the keyboard cover 16 is folded such that the inner face 17a of the first cover member 17 and the inner face 18a of the second cover member 18 move toward each other, and the keyboard cover 16 in the folded state is placed forwardly of the housing 6 on the desk 100. Where the keyboard cover 16 is placed in such a state as just described, the second cover member 18 is positioned above the first cover member 17 and the free end portion 18b of the second cover member 18 contacts with a front end portion of the top wall 6a of the housing 6. Since the lower portion 6g of the front wall 6e of the housing 6 is inclined so as to be displaced downwardly rearwards as described hereinabove, a space is formed below the upper portion 6f forwardly of the lower portion 6g, and a front end portion of the end portion 17b of the first cover member 17 contacts with a lower edge of the upper portion 6f. Meanwhile, the first cover member 17 is supported at the small projections 17d thereof on the desk 100.

Since the front end portion of the free end portion 18b of the second cover member 18 contacts with the front end portion of the top wall 6a while the front end portion of the end portion 17b of the first cover member 17 contacts with the upper portion 6f and the first cover member 17 is supported at the small projections 17d thereof on the desk 100 as described above, the keyboard cover 16 is placed stably on the desk 100 and the user can use the keyboard cover 16 as a hand receiving table whose hand receiving face is provided by an outer face 18d of the second cover member 18. At this time, the second cover member 18 of the keyboard cover 16 is inclined forwardly downwards moderately. Further, since the keyboard cover 16 contacts only at the small projections 17d thereof with the desk 100, otherwise possible damage to the keyboard cover 16 can be prevented.

It is to be noted that the keyboard cover 16 can be used as a hand receiving table in any of a state wherein the keyboard 3 is placed on the desk 100 while the support feet 11 and 13 are accommodated in the accommodation recesses 10 and 12, respectively, and another state wherein the keyboard 3 is placed on the desk 100 while the support feet 11 and 13 are pulled out from the accommodation recesses 10 and 12, respectively.

Figure 9:
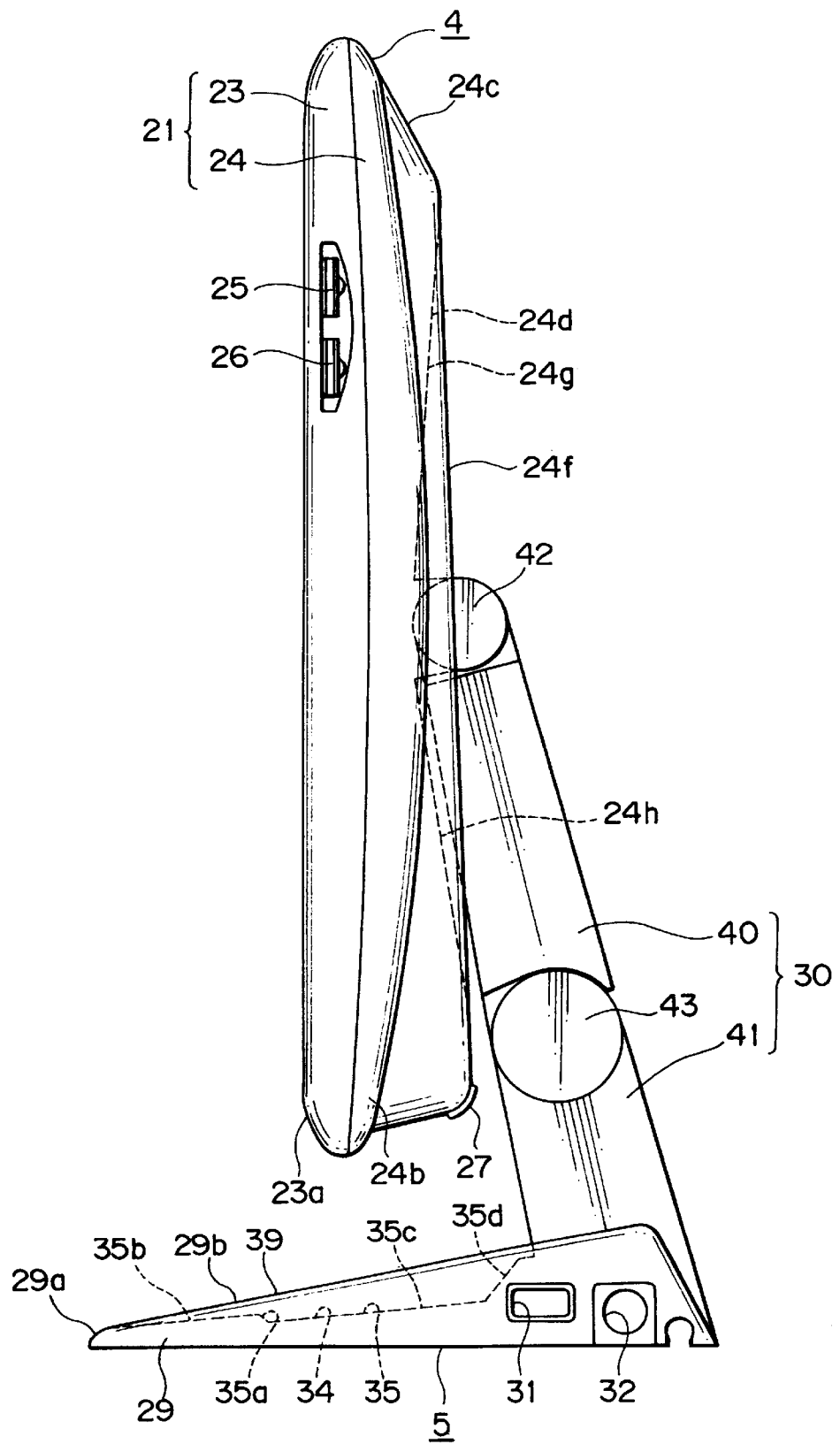
Figure 10:
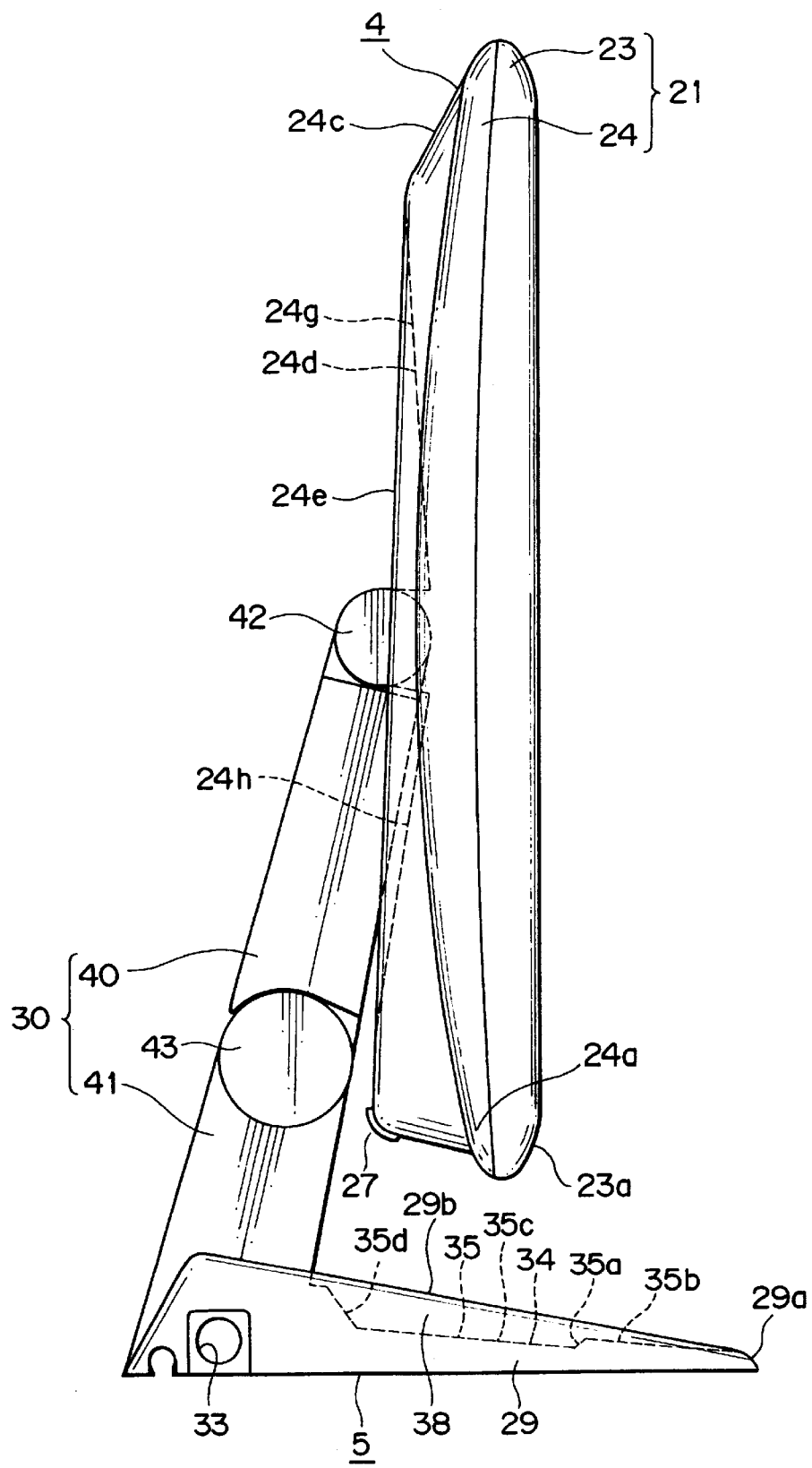
Figure 11:
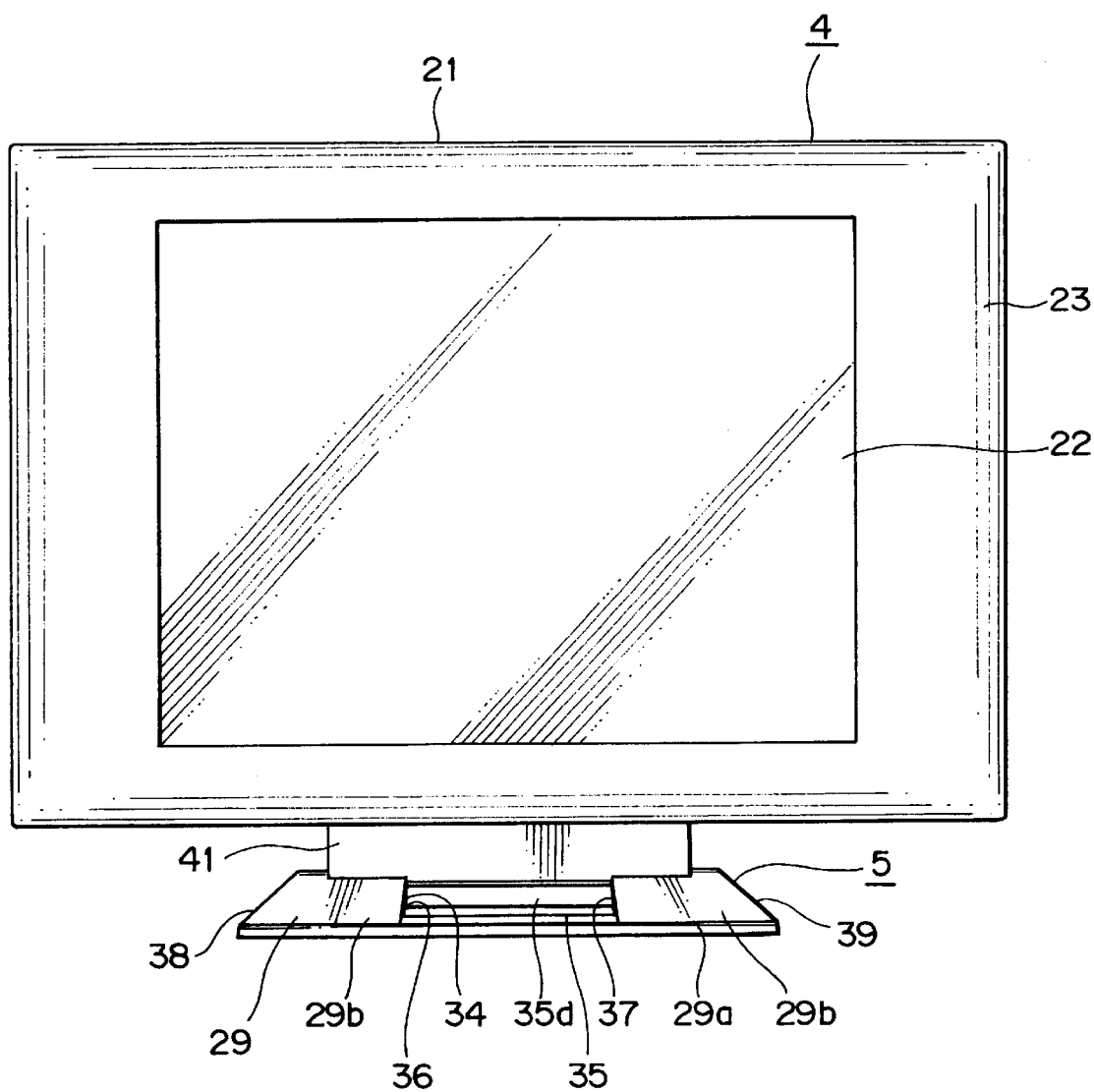

The display unit 4 has a display screen 22 provided on the front of a panel 21 thereof and has a horizontal dimension substantially equal to a horizontal dimension of the keyboard 3 as seen in FIGS. 9 to 14. The panel 21 includes a front panel 23 and a rear panel 24 coupled to each other, and the display screen 22 is provided on the front of the front panel 23 as seen in FIG. 11. The front panel 23 has a pair of speaker sections (not shown) provided thereon on the opposite sides of the panel 21. The front panel 23 has a lower end edge formed as an inclined edge 23a which is displaced downwardly rearwards. A pair of dial knobs 25 and 26 for adjusting the brightness or the sound volume of the display screen 22 are provided on the right side face of the front panel 23 as seen in FIG. 9.

A central upper end portion 24c of the rear panel 24 except a left end portion 24a and a right end portion 24b is inclined so as to project downwardly rearwards as seen in FIGS. 9, 10 and 12 to 14. Of portions of the rear panel 24 below the central upper end portion 24c, portions on the opposite side of a central portion 24d, that is, a left side middle portion 24e and a right side middle portion 24f, are provided such that they project rearwardly rather than the left end portion 24a and the right end portion 24b.

A pair of ground seats 27 formed from a flexible material such as rubber are adhered to lower edges of the left side middle portion 24e and the right side middle portion 24f as seen in FIGS. 9, 10 and 12 and 14. The ground seats 27 are adhered such that they extend from the lower edges of rear faces of the left side middle portion 24e and the right side middle portion 24f to the rear edges of lower faces of the left side middle portion 24e and the right side middle portion 24f, respectively.

Figure 12:
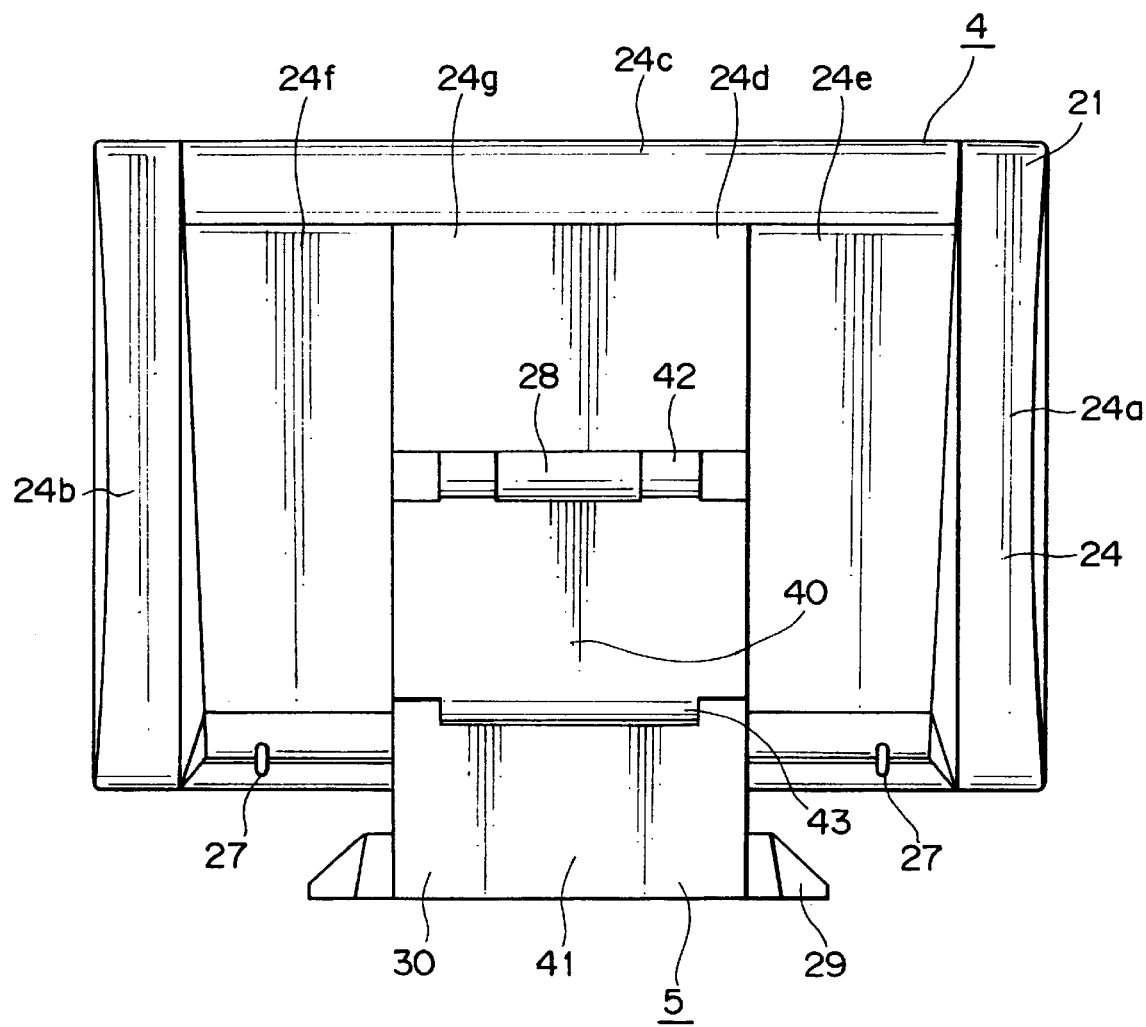
Figure 14:
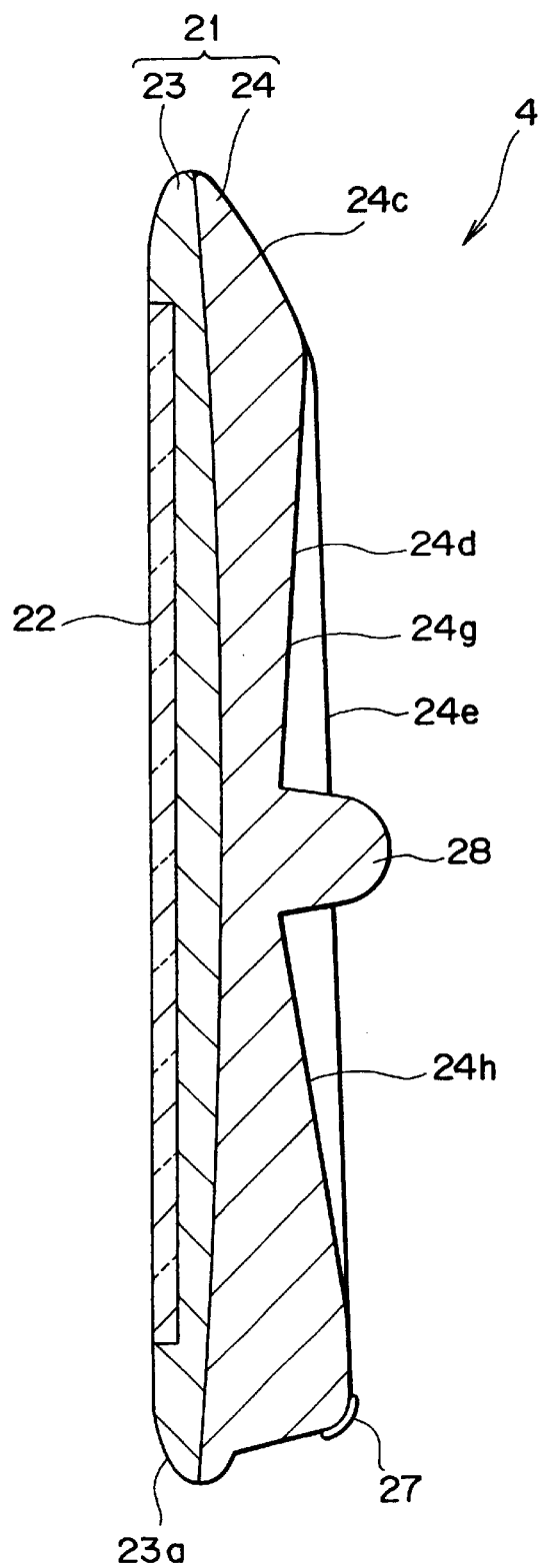
FIG. 14 is a schematic vertical sectional view of the display unit shown in FIG. 9.

A middle portion of the central portion 24d in the upward and downward direction is provided as a supported portion 28 partly projected rearwardly as seen in FIGS. 12 and 14. A face of the central portion 24d above the supported portion 28 is formed as a first inclined face (upper inclined face) 24g which is displaced forwardly toward the supported portion 28, and another face of the central portion 24d below the supported portion 28 is formed as a second inclined face 24h which is displaced forwardly toward the supported portion 28 as seen in FIGS. 9, 10 and 14.

The stand 5 includes a base 29 and a support arm 30 extending upwardly from a rear end portion of the base 29 as seen in FIGS. 9 to 13.

A left side portion and a right side portion of an upper face of the base 29 except a front end portion 29a are formed as moderately inclined portions 29b which are displaced rearwardly upwards as seen in FIGS. 9 and 10. Also the front end portion 29a is inclined so as to be displaced rearwardly upwards. The inclination angle of the front-end portion 29a is greater than that of the inclined portions 29b.

A USB (Universal Serial Bus) connector 31 and a mouse connector 32 are provided on a right side face of the base 29 as seen in FIG. 9. Meanwhile, a keyboard connector 33 is provided on a left side wall of the base 29 as seen in FIG. 10.

An insertion recess 34 opened upwardly is formed on the top face of the base 29 such that it is positioned between the inclined portions 29b as seen in FIGS. 9 to 11 and 13. A front end of a bottom face 35 of the insertion recess 34 is contiguous to front ends of the inclined portions 29b, and a portion of the bottom face 35 which is contiguous to the rear side of an offset or shouldered portion 35a is formed as a deep bottom portion 35c which is deeper than a shallow bottom portion 35b.

The shallow bottom portion 35b and the deep bottom portion 35c are both formed as inclined faces which are moderately inclined rearwardly upwards. The deep bottom portion 35c has a dimension in the forward and backward direction equal to or a little greater than the dimension of the bottom faces 8c and 9c of the positioning projections 8 and 9 of the keyboard 3 in the forward and backward direction. A face portion of the bottom face 35 which is rearwardly contiguous to the deep bottom portion 35c is formed as an inclined face 35d which is displaced rearwardly upwards. The inclined face 35d has an inclination angle smaller than that of the rear faces 8b and 9b of the positioning projections 8 and 9. Further, the inclination angle of the offset portion 35a and the inclination angle of the front faces 8a and 9a of the positioning projections 8 and 9 are substantially equal to each other.

A left side opening edge and a right side opening edge of the insertion recess 34 are formed as position restriction portions 36 and 37 for restricting movement of the keyboard 3 when the keyboard 3 is moved in the leftward or rightward direction as hereinafter described. Also a left side edge and a right side edge of the base 29 are formed as position restriction portions 38 and 39 for restricting movement of the keyboard 3.

The support arm 30 includes an upper arm member 40 and a lower arm member 41, and the upper arm member 40 is supported for pivotal motion on the lower arm member 41 as seen in FIGS. 9 to 13.

The display unit 4 is supported for pivotal motion at an upper end portion of the upper arm member 40 through the supported portion 28. The portion of the upper arm member 40 at which the display unit 4 is supported serves as an upper pivotal fulcrum 42. The lower arm member 41 is provided integrally with the base 29 and supports, at an upper end portion thereof, a lower end portion of the upper arm member 40. The portion of the upper arm member 40 at which it is supported on the lower arm member 41 serves as a lower pivotal fulcrum 43. In a state wherein the upper arm member 40 is not pivoted with respect to the lower arm member 41 and they extend on a straight line, the support arm 30 is inclined a little forwardly from the vertical direction as seen in FIGS. 9 and 10.

A pivotal support mechanism 44 is provided in the inside of the stand 5 as seen in FIG. 15. The pivotal support mechanism 44 allows the display unit 4 to be pivoted with respect to the upper arm member 40 and allows the upper arm member 40 to be pivoted with respect to the lower arm member 41.

The pivotal support mechanism 44 has a pair of base brackets 45 disposed at lower end portions thereof in a leftwardly and rightwardly spaced relationship from each other. Each of the base brackets 45 has a base portion 45a and a support portion 45b formed integrally with and extending uprightly from the base portion 45a. A stopper pin 45c is provided at a rear end portion of an inner face of the each of the support portion 45b such that it extends inwardly.

A torque bracket 46 positioned on the left side includes a mounting piece 46a and a supported piece 46b formed integrally with the mounting piece 46a such that it extends in a perpendicular direction from a left side edge of the mounting piece 46a. A torque bracket 47 positioned on the right side includes a mounting piece 47a and a pair of supported pieces 47b formed integrally with the mounting piece 47a such that they extend in a perpendicular direction from the opposite left and right side edges of the mounting piece 47a. The supported pieces 46b and 47b of the torque brackets 46 and 47 have first engaging recesses 46c and 47c and second engaging recesses 46d and 47d formed in a circumferentially spaced relationship from each other thereon, respectively.

The supported piece 46b of the torque bracket 46 is supported for pivotal motion on the support portion 45b of the base bracket 45 on the left side by a shaft 48. The supported pieces 47b of the torque bracket 47 are supported for pivotal motion on the support portion 45b of the base bracket 45 on the right side by a shaft 49. The shaft 49 is longer than the shaft 48 and projects leftwardly by a great extent from the corresponding base bracket 45.

Figure 16:
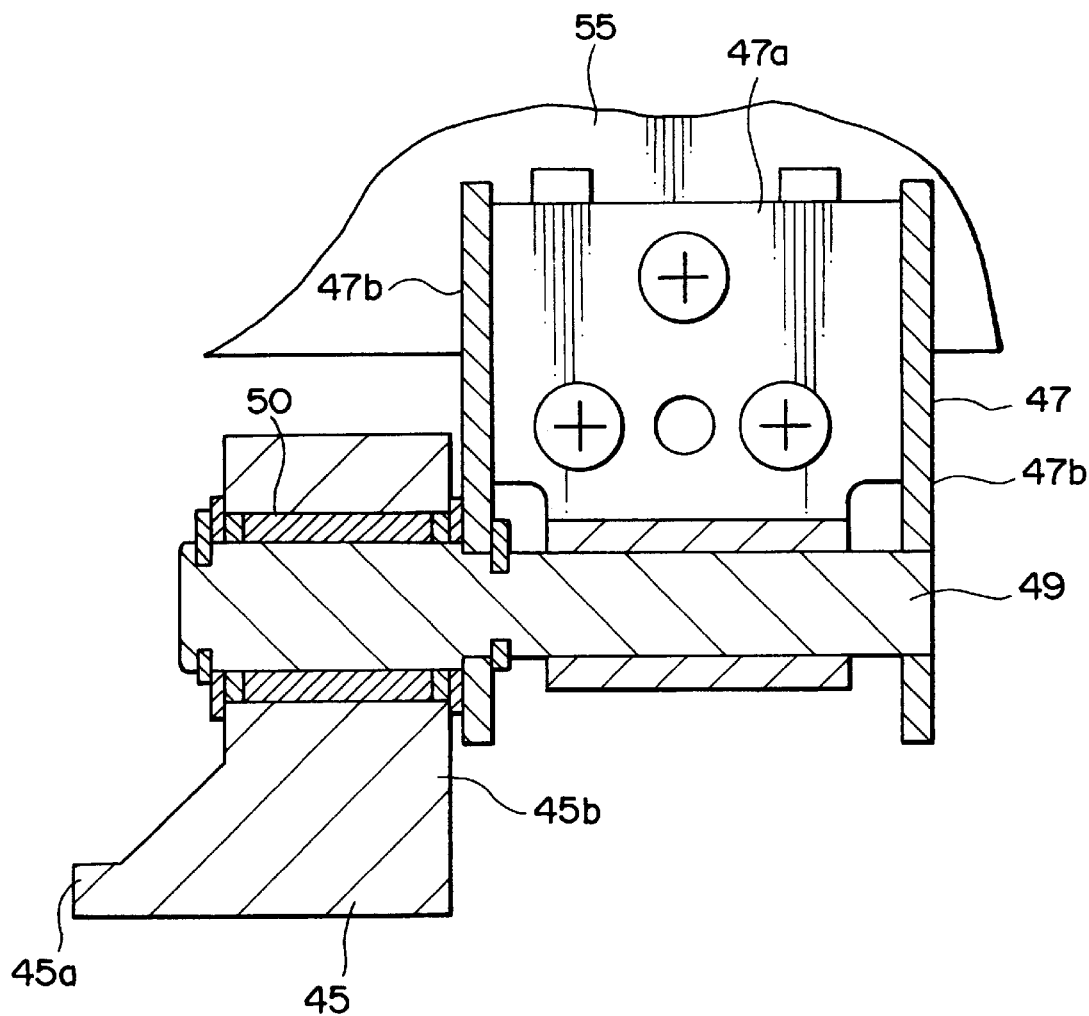
FIG. 16 is a sectional view taken along line XVI—XVI of FIG. 15.
Figure 17:
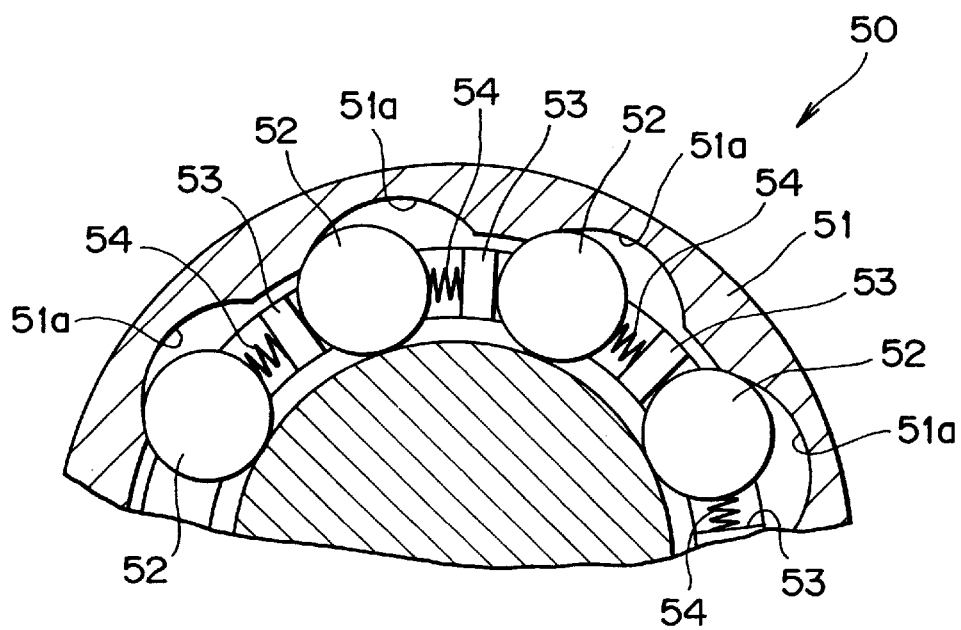
FIG. 17 is an enlarged sectional view showing a one-way clutch mechanism of the information processing apparatus of FIG. 1 when it is rotated while a load is applied to an outer race.
Figure 18:
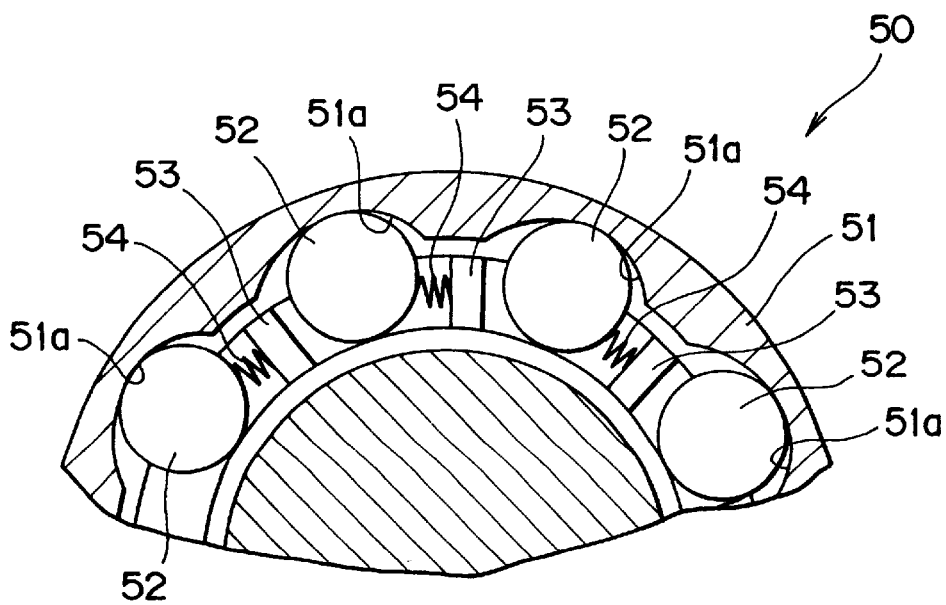
FIG. 18 is a view similar to FIG. 17 but showing the one-way clutch mechanism when it is rotated while no load is applied to the outer race.

A one-way clutch mechanism 50 is interposed between the base bracket 45 on the right side and the torque bracket 47. The one-way clutch mechanism 50 includes a plurality of rollers 52 interposed between an outer race 51 and the shaft 48 which serves as an inner race as seen in FIGS. 16 to 18. A plurality of cam faces 51a in the form of a curved face are formed in an equally spaced relationship from each other in a circumferential direction on an inner face of the outer race 51, and the rollers 52 are disposed individually corresponding to the cam faces 51a. The rollers 52 are supported for movement in circumferential directions with a retainer 53 and a spring member 54 interposed between each adjacent ones thereof.

If the torque bracket 47 is pivoted in one direction, then the rollers 52 are pressed against the cam faces 51a and the shaft 49 by the spring members 54 to exert friction and therefore the outer race 51 is rotated under the friction as seen from FIG. 17. On the contrary, if the torque bracket 47 is pivoted in the direction opposite to the one direction, then the rollers 52 are moved so as to be released from the cam faces 51a and therefore do not exert friction. Consequently, the outer race 51 is rotated idly free from the shaft 49 as seen from FIG. 18. Accordingly, when the user pivots the torque bracket 47 in the one direction, a fixed load acts upon the user, but when the user pivots the torque bracket 47 in the opposite direction, no load acts upon the user.

The torque bracket 47 can be turned in the one direction until the first engaging recess 47c is engaged with the stopper pin 45c of the corresponding base bracket 45. In this instance, also the torque bracket 46 is pivoted integrally with the torque bracket 47, and when the first engaging recess 47c is engaged with the stopper pin 45c of one of the base brackets 45, also the first engaging recess 46c is engaged with the stopper pin 45c of the other base bracket 45.

On the other hand, the torque bracket 47 can be pivoted in the opposite direction until the second engaging recess 47d is engaged with the stopper pin 45c of the base bracket 45. In this instance, also the torque bracket 46 is pivoted integrally with the torque bracket 47, and when the second engaging recess 47d is engaged with the stopper pin 45c of one of the base brackets 45, also the second engaging recess 46d is engaged with the stopper pin 45c of the other base bracket 45.

A main plate 55 is attached at a lower end portion thereof to the mounting pieces 46a and 47a of the torque brackets 46 and 47 by means of screws. A pair of support brackets 56 are attached in a leftwardly and rightwardly spaced relationship from each other to an upper end portion of the main plate 55 by means of screws.

Each of the support brackets 56 includes a mounted piece 56a and a pair of support pieces 56b formed integrally with the mounted piece 56a such that they extend in a perpendicular direction from the opposite left and right side edges of the mounted piece 56a. A shaft 57 is supported against rotation on the support pieces 56b and partially extends outwardly from one of the support pieces 56b which is positioned on the outer side.

A torque bracket 58 is supported for pivotal motion at an outer end portion of each of the shafts 57. Each of the torque brackets 58 includes a mounted piece 58a and a support piece 58b formed integrally on the mounted piece 58a in such a manner as to project in a perpendicular direction from the mounted piece 58a and supported on the shaft 57.

A coil spring 59 is disposed between the outwardly positioned support piece 56b of each of the support brackets 56 and the support piece 58b of the corresponding torque bracket 58 and fitted around the corresponding shaft 57. Each of the coil springs 59 has an inner end portion 59a supported on a corresponding one of the support pieces 56b and an outer end portion 59b supported on a corresponding one of the support pieces 58b.

The pivotal support mechanism 44 is configured in such a manner as described above. The base brackets 45 are disposed in the inside of the lower arm member 41 and the base 29 and are secured at the base portions 45a thereof in the inside of the base 29. The torque brackets 46 and 47, main plate 55 and support brackets 56 are disposed in the inside of the upper arm member 40. The torque brackets 58 are disposed in the inside of the display unit 4 and are secured at the mounted pieces 58a thereof in the inside of the display unit 4.

If the display unit 4 is pivoted with respect to the upper arm member 40 around the upper pivotal fulcrum 42, then the torque brackets 58 are pivoted under suitable friction exerted from the shafts 57. Accordingly, the display unit 4 can be stopped at an arbitrary pivoted position with respect to the upper arm member 40. In this instance, since the pivotal motion of the display unit 4 with respect to the upper arm member 40 may exert a force to urge the display unit 4 to pivot in a direction opposite to the pivoting direction to return the display unit 4 in the direction opposite to the pivoting direction, when the display unit 4 is pivoted to a certain position, a force to urge the display unit 4 in the pivoting direction is generated by the coil springs 59.

If the upper arm member 40 is pivoted with respect to the lower arm member 41 around the lower pivotal fulcrum 43, then the torque brackets 46 and 47 are pivoted with respect to the shafts 48 and 49, respectively. At this time, when the torque bracket 47 is turned in the one direction, that is, in the direction in which the upper arm member 40 is tilted forwardly, then the rollers 52 of the one-way clutch mechanism 50 are pressed against the cam faces 51a of the outer race 51 and the shaft 49 by the spring members 54 to exert friction and the outer race 51 is rotated under the friction as described hereinabove. Accordingly, the upper arm member 40 can be stopped at an arbitrary pivoted position, and the display unit 4 supported on the upper arm member 40 can be stopped at an arbitrary position in the upward and downward direction.

On the other hand, if the torque bracket 47 is pivoted in the direction opposite to the one direction, that is, in the direction in which the upper arm member 40 is moved up, then since the rollers 52 of the one-way clutch mechanism 50 are moved so as to be released from the cam faces 51a, no friction is exerted and the outer race 51 is rotated idly free from the shaft 49 as described hereinabove. At this time, the user will normally lift the display unit 4 to pivot the upper arm member 40. Consequently, when the torque bracket 47 is pivoted in the other direction, no load acts upon the user except the weight of the display unit 4 and the upper arm member 40 themselves.

Accordingly, where the one-way clutch mechanism 50 is used for the lower pivotal fulcrum 43, when the user tries to lift the display unit 4, no load acts upon the user except the weight of the display unit 4 and the upper arm member 40 themselves, and consequently, the display unit 4 can be lifted readily with weak force. In this regard, augmentation of the convenience of use of the information processing apparatus 1 can be anticipated.

Further, since the display unit 4 can be stopped at an arbitrary position, the display unit 4 can be used at a suitable position.

The keyboard 3 is connected to the keyboard connector 33 while a mouse 60 is connected to the mouse connector 32. The keyboard 3 and the mouse 60 are thus connected to the apparatus body 2 by a connection cable 61 through the keyboard connector 33 and the mouse connector 32, respectively. Also the display unit 4 is connected to the apparatus body 2 by the connection cable 61. Similarly, the USB connector 31 provided on the stand 5 is connected to the apparatus body 2 by the connection cable 61.

The information processing apparatus 1 includes an inputting pen 62 for hand-written inputting. The inputting pen 62 is held on a pen stand 63 when it is not used.

In the following, forms of the information processing apparatus 1 when it is used and is not used are described.

Figure 19:
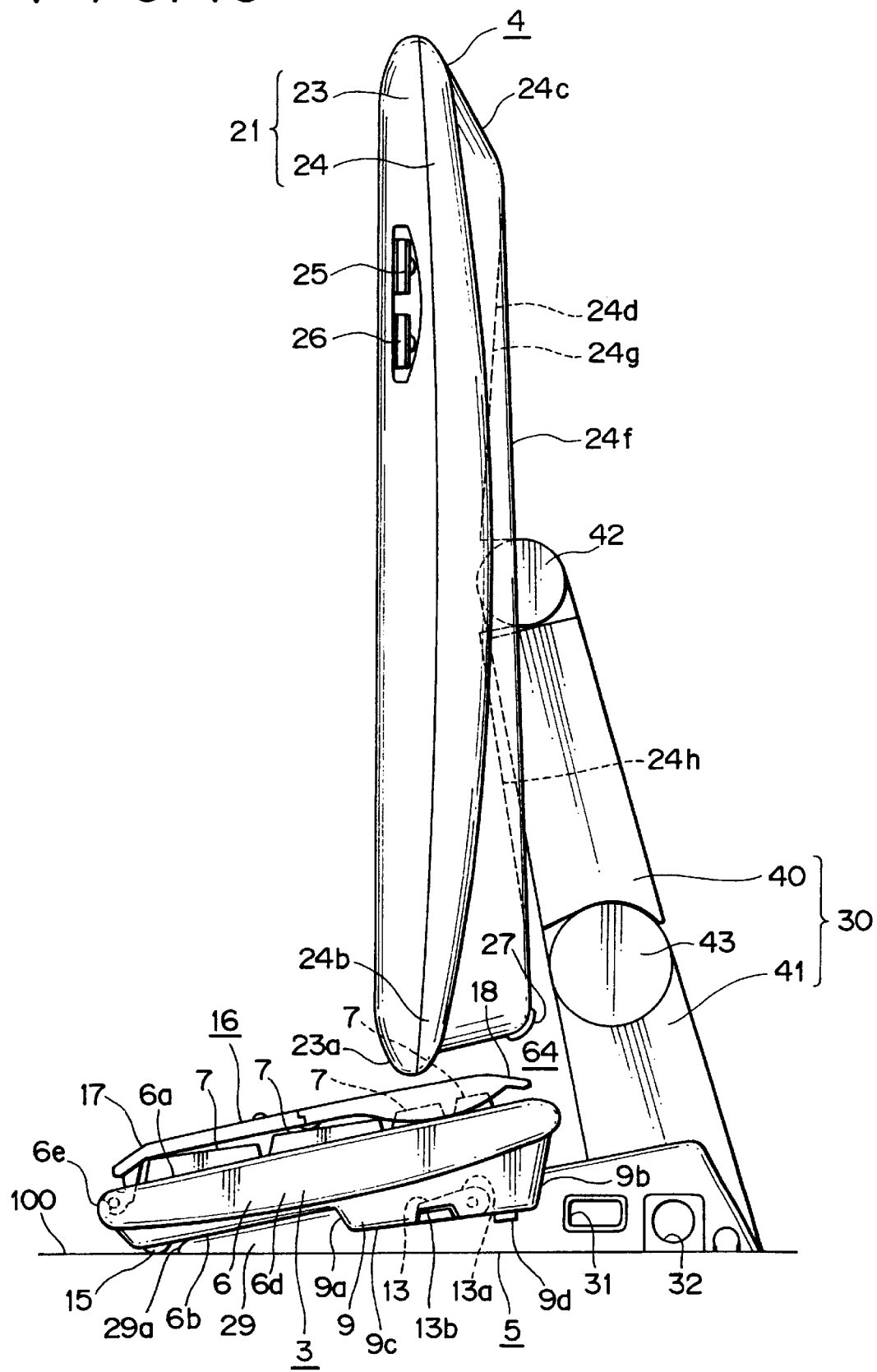
FIG. 19 is a side elevational view showing the information processing apparatus of FIG. 1 when it is not used and the keyboard is partially accommodated in an accommodation space.

When the information processing apparatus 1 is not used, the display unit 4 is positioned such that the display screen 22 is directed forwardly as seen in FIG. 19. When the display screen 22 is directed forwardly, the lower end of the display unit 4 is positioned immediately forwardly of the lower pivotal fulcrum 43, and an accommodation space 64 is formed between the display unit 4 and the base 29 of the stand 5 positioned below the display unit 4. Accordingly, a rear end portion of the keyboard 3 can be inserted from forwardly into the accommodation space 64 until the keyboard 3 is placed on the base 29 of the stand 5. In this state, the bottom wall 6b of the housing 6 of the keyboard 3 is received by the inclined portions 29b of the base 29. Since the keyboard 3 is placed on the base 29 and accommodated in the accommodation space 64 when it is not used, the keyboard 3 does not occupy an unnecessary large area of the desk 100, and consequently, reduction of the space can be anticipated.

Figure 20:
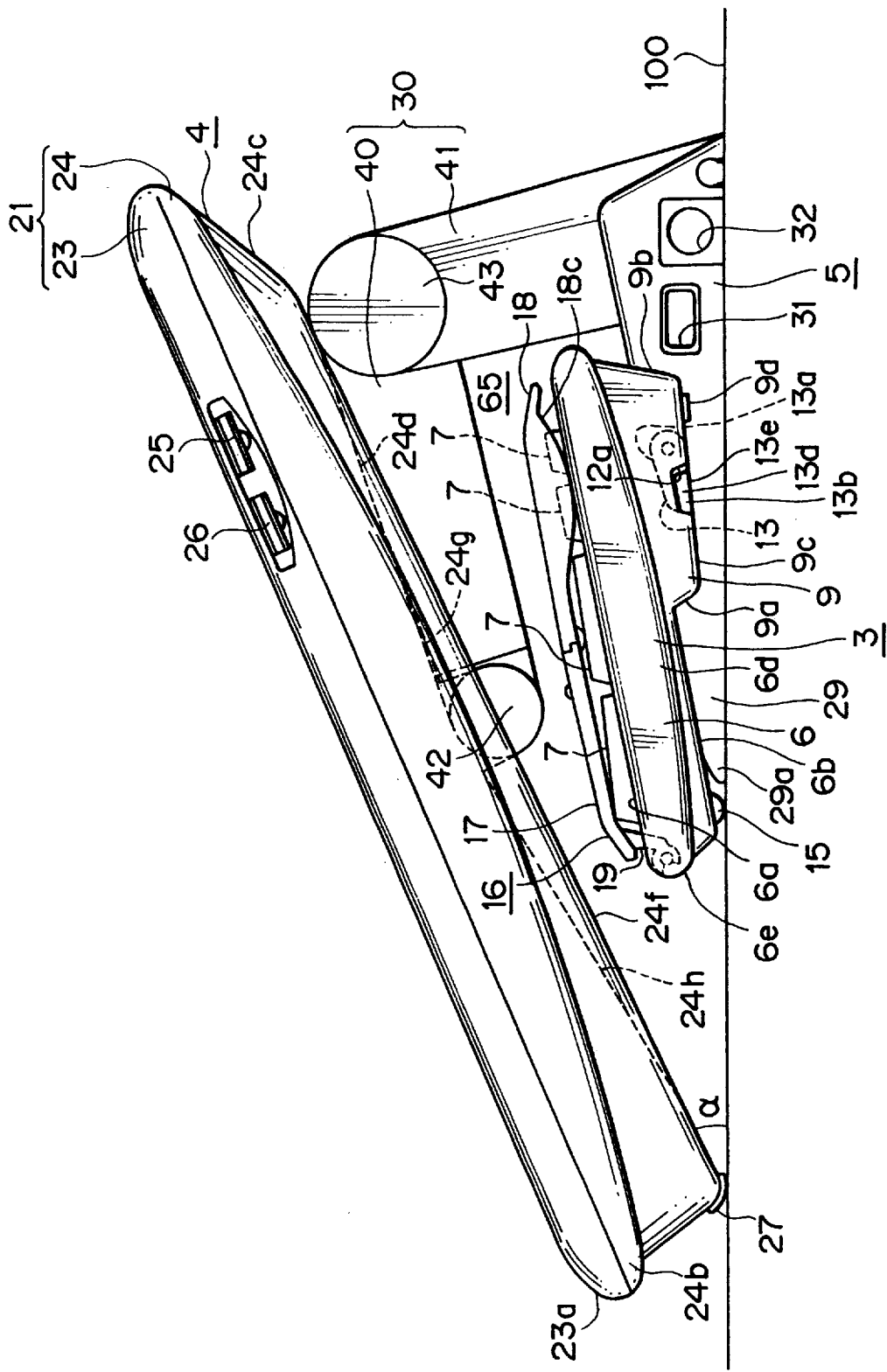
FIGS. 20 and 21 are a side elevational view and a top plan view, respectively, showing the information processing apparatus of FIG. 1 when it is not used and the keyboard whose operation keys are covered is accommodated in the accommodation space.
Figure 21:
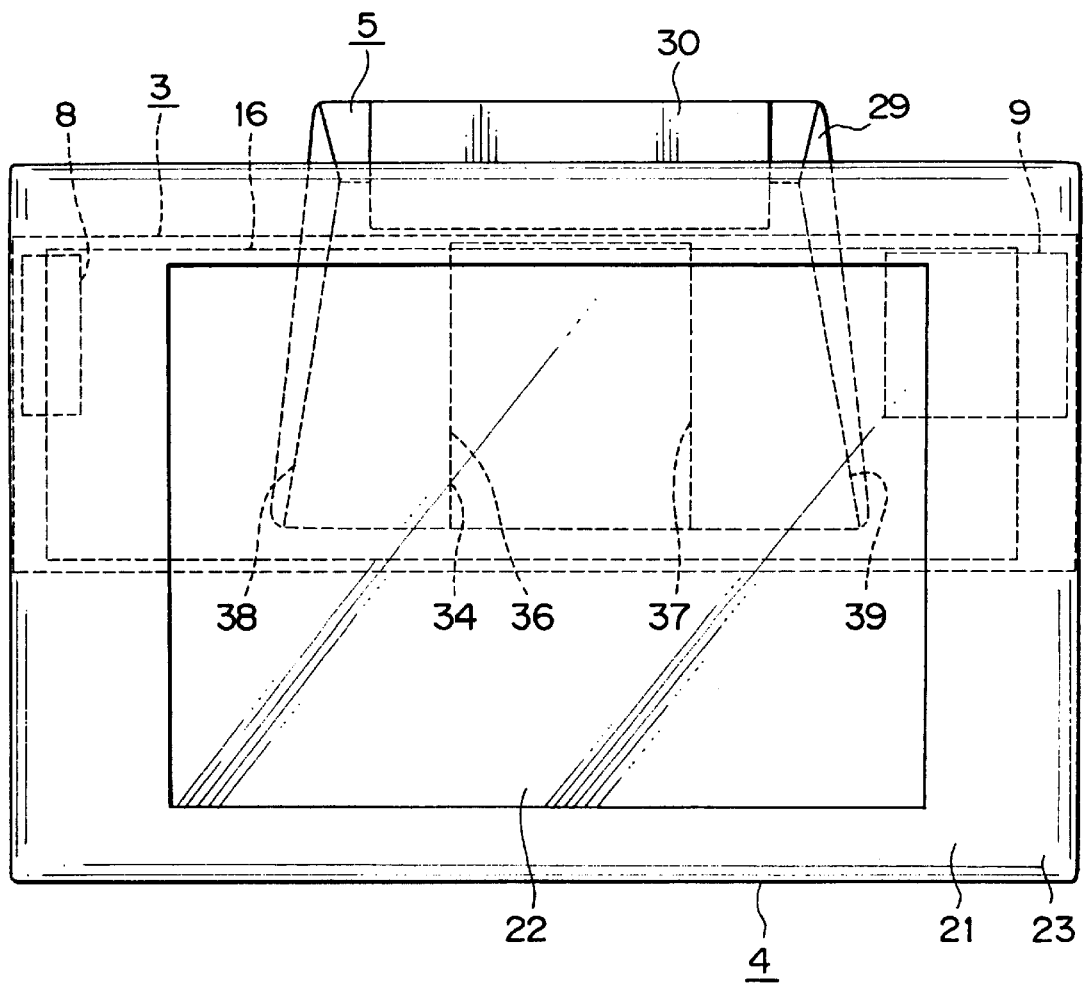
Figure 22:
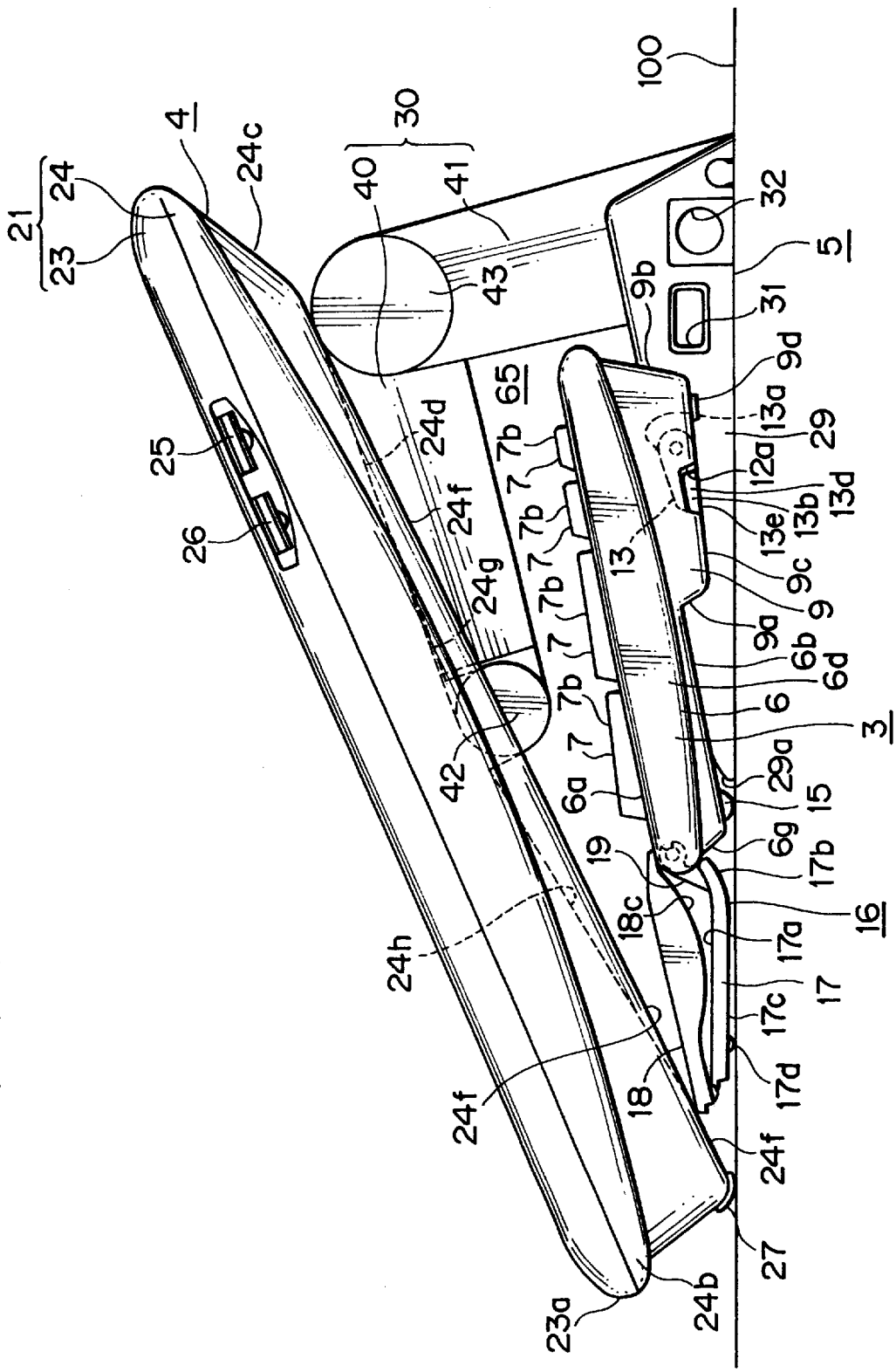
FIG. 22 is a side elevational view showing the information processing apparatus of FIG. 1 when the keyboard whose operation keys are uncovered is accommodated in the accommodation space.

When the information processing apparatus 1 is not used, the keyboard 3 can be accommodated between the display unit 4 and the base 29 of the stand 5 as seen in FIGS. 20 to 22. In particular, while the keyboard 3 is placed on the base 29 of the stand 5, the upper arm member 40 is pivoted in a forwardly tilting direction around the lower pivotal fulcrum 43 with respect to the lower arm member 41 and the display unit 4 is pivoted around the upper pivotal fulcrum 42 with respect to the upper arm member 40 to a position in which the display screen 22 thereof is directed upwardly until the ground seats 27 adhered to the rear panel 24 of the display unit 4 are brought into contact with the desk 100. In the state wherein the ground seats 27 contact with the desk 100, the upper inclined face 24g of the rear panel 24 contacts face-by-face with the upper arm member 40. In this instance, the inclination angle α of the display unit 4 with respect to the desk 100 is approximately 22°.

When the upper arm member 40 and the display unit 4 are pivoted in such a manner as described above, an accommodation space 65 is formed between the rear panel 24 of the display unit 4 and the base 29 of the stand 5, and the keyboard 3 is accommodated in the accommodation space 65. Since the leftward and rightward dimension of the keyboard 3 and the leftward and rightward dimension of the display unit 4 are substantially equal to each other, the keyboard 3 accommodated in the accommodation space 65 is entirely covered from above with the display unit 4 as seen in FIG. 21. In this instance, a fixed gap is left between the keyboard 3 and the display unit 4 so that they may not interfere with each other.

In the information processing apparatus 1, since the keyboard 3 can be accommodated in the accommodation space 65 when it is not used as described above, the keyboard 3 does not occupy an unnecessary area of the desk 100, and consequently, reduction of the space can be anticipated.

Further, sticking of dust to the operation keys 7 of the keyboard 3 and admission of dust into the housing 6 of the keyboard 3 can be prevented.

It is to be noted that the state wherein the keyboard 3 is accommodated in the accommodation space 65 is a manner of use when, for example, hand-written inputting is performed using only the inputting pen 62 without using the keyboard 3. Also in such a manner of use, reduction of the space can be anticipated.

As described above, when the keyboard 3 is accommodated in the accommodation space 65, since the ground seats 27 of the display unit 4 contact with the desk 100 and the upper inclined face 24g of the rear panel 24 contact face-by-face with the upper arm member 40, the display unit 4 is disposed stably and play of the display unit 4 can be prevented.

It is to be noted that the keyboard 3 can be accommodated in the accommodation space 65 in any of a state wherein the operation keys 7 are covered with the keyboard cover 16 as seen in FIG. 20 and another state wherein the operation keys 7 are uncovered and the keyboard cover 16 is disposed forwardly of the keyboard 3 as seen in FIG. 22.

Where the keyboard 3 is accommodated in the accommodation space 65 with the operation keys 7 covered with the keyboard cover 16, sticking of dust to the operation keys 7 and admission of dust into the housing 6 of the keyboard 3 can be prevented further effectively.

Also where the operation keys 7 are uncovered and the keyboard cover 16 are disposed forwardly of the keyboard 3 as described above, the keyboard 3 can be accommodated into the accommodation space 65. Consequently, augmentation of the convenience of use of the keyboard 3 can be anticipated.

Now, various forms of the information processing apparatus 1 when it is used are described.

Figure 23:
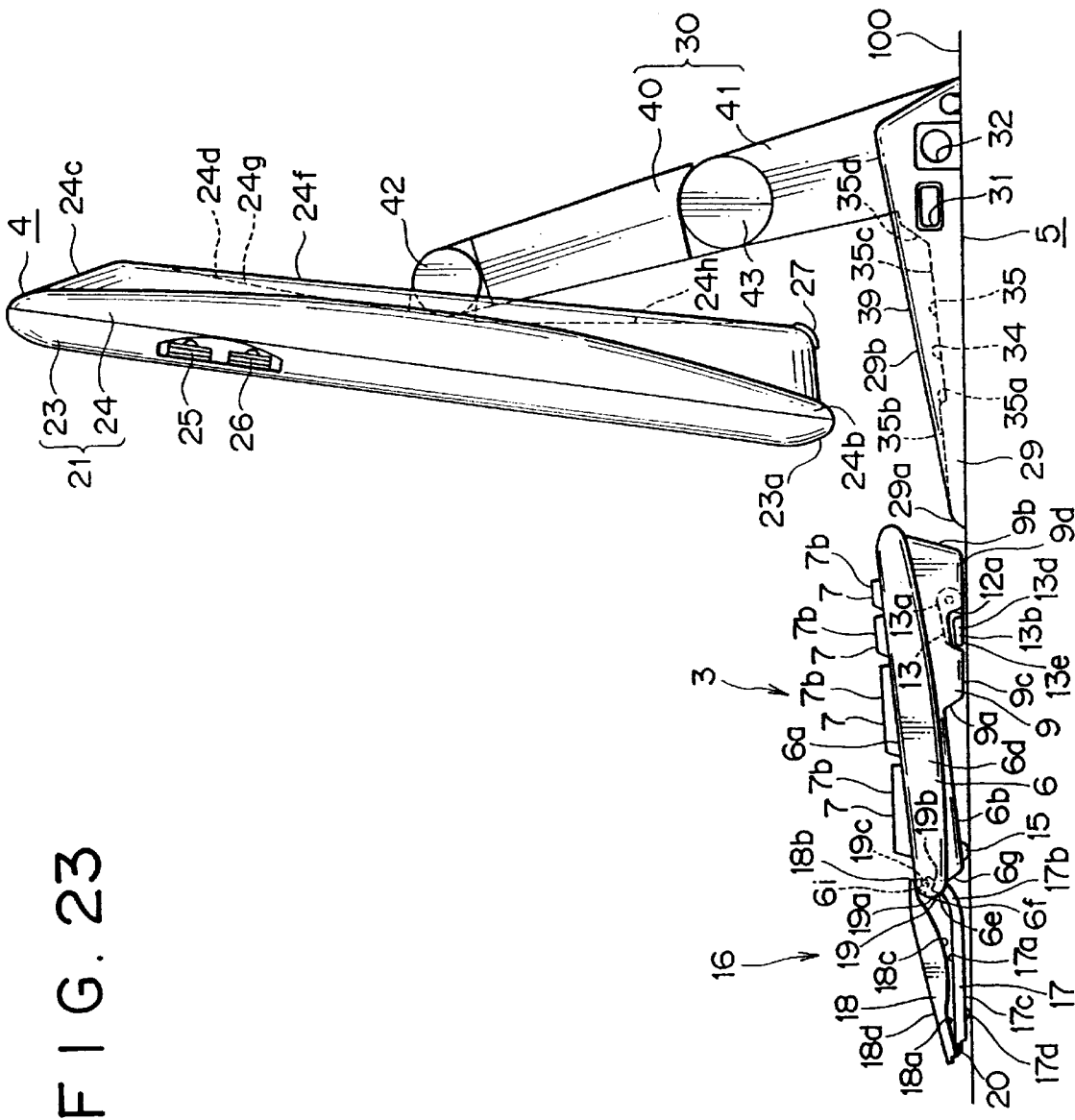
FIG. 23 is a side elevational view of the information processing apparatus of FIG. 1 in a state wherein it is used in a standard form of use.

FIG. 23 illustrates a standard form of use of the information processing apparatus 1. Referring to FIG. 23, the upper arm member 40 is not pivoted with respect to the lower arm member 41, and the display unit 4 is set to a suitable angle in accordance with the eyes of the user. In this instance, the operation keys 7 of the keyboard 3 are uncovered, and the keyboard cover 16 is positioned in a folded state forwardly of the keyboard 3. Accordingly, the user can operate all of the operation keys 7 of the keyboard 3 and further can use the inputting pen 62 to perform an inputting operation.

In this instance, the keyboard cover 16 in the folded state can be used as a hand receiving table as described above, which allows the user to operate the operation keys 7 easily. Consequently, augmentation in convenience of use can be anticipated.

Figure 24:
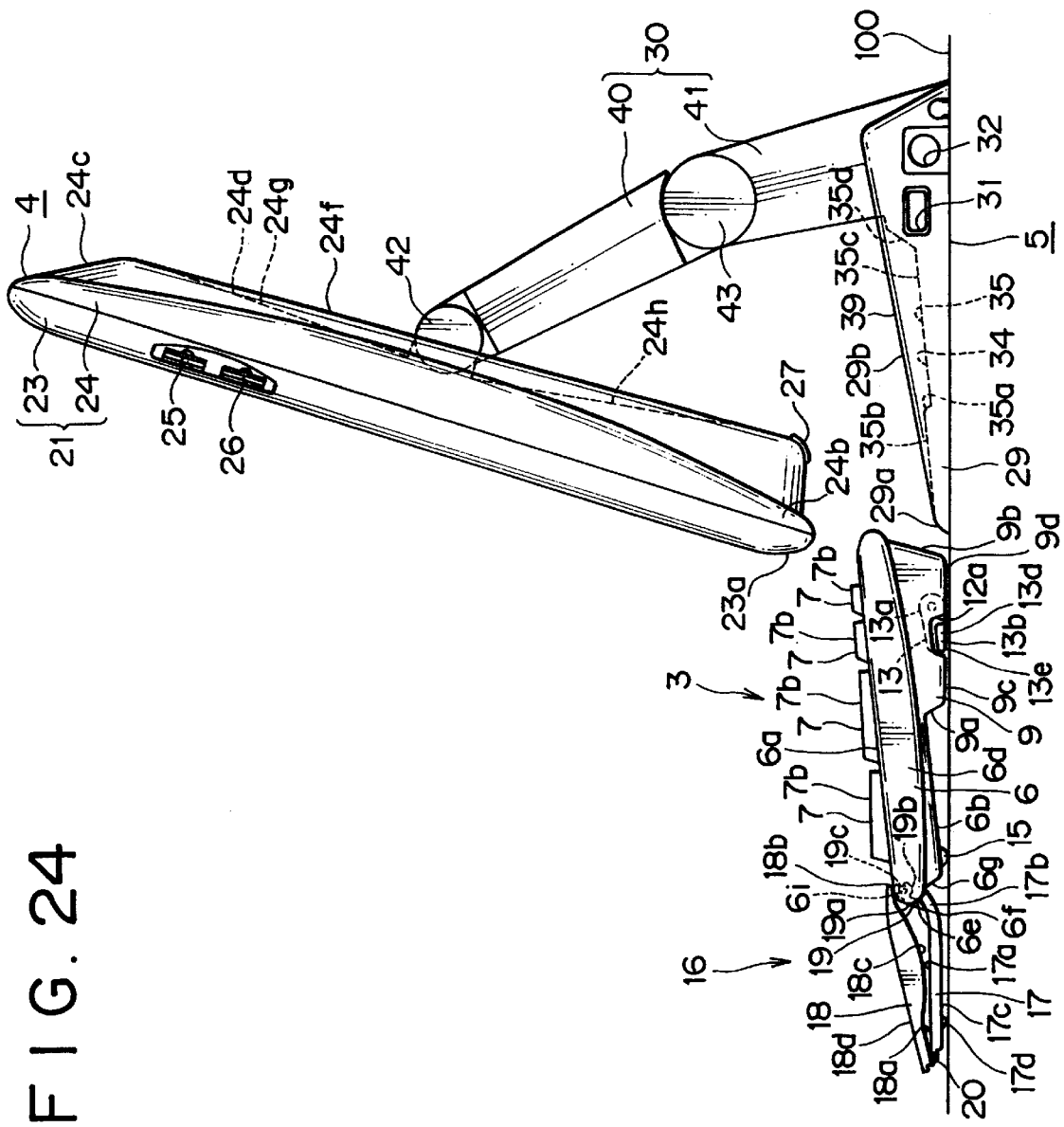
FIG. 24 is a side elevational view of the information processing apparatus of FIG. 1 in a state wherein it is used while the display unit is in its lowered position.
Figure 25:
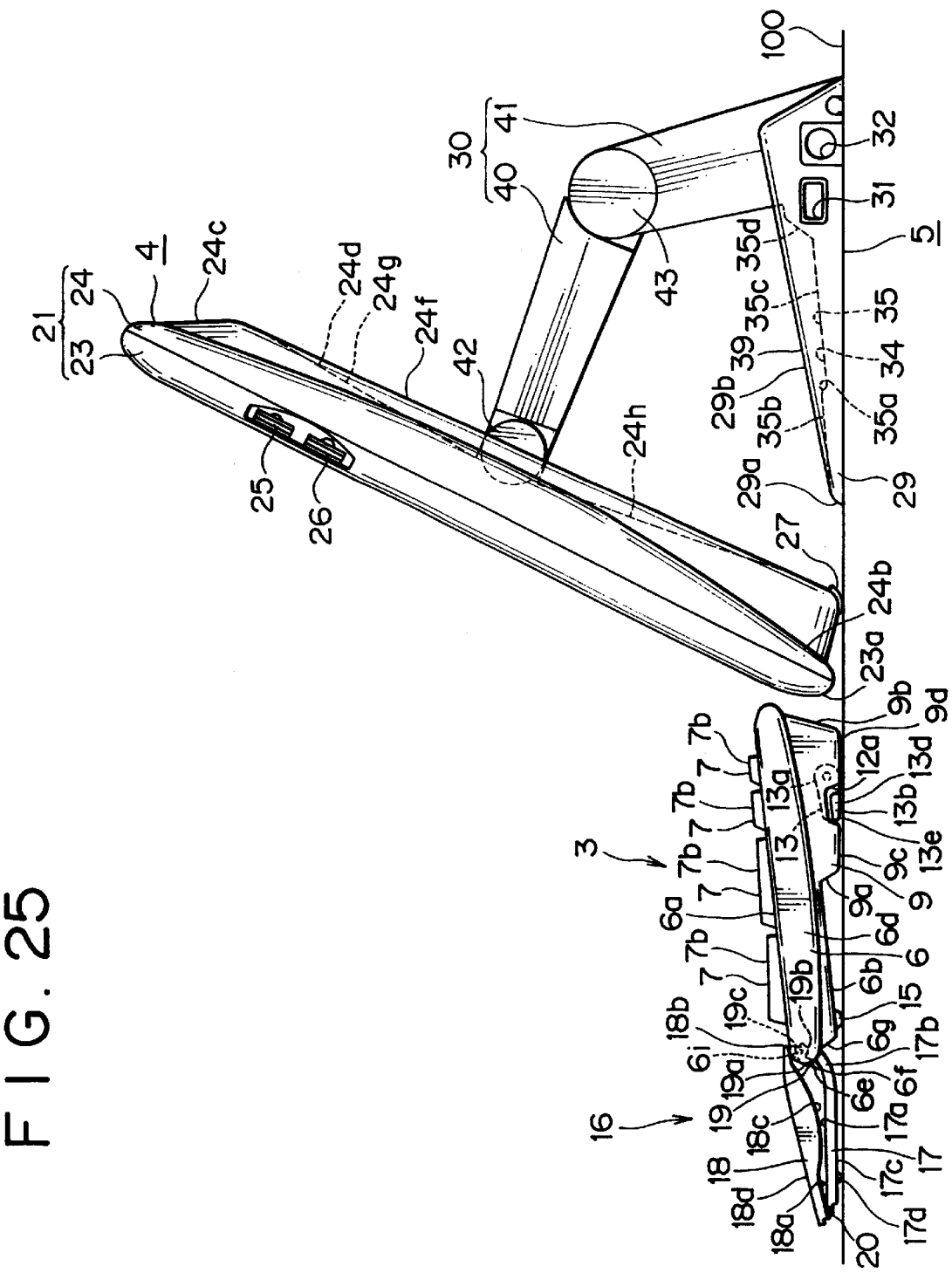
FIG. 25 is a side elevational view of the information processing apparatus of FIG. 1 in a state wherein it is used while the display unit is placed on a desk.

When the information processing apparatus 1 is to be used, the display unit 4 and the upper arm member 40 can be pivoted to adjust the height and the angle of the display unit 4, and the user can set the display unit 4 to desired vertical and pivotal positions. FIG. 24 illustrates another form of use of the information processing apparatus 1 wherein the display unit 4 is positioned at a rather lowered position. FIG. 25 illustrates a further form of use of the information processing apparatus 1 wherein the display unit 4 rests on the desk 100. Where the information processing apparatus 1 is used with the display unit 4 positioned at a lowered position as seen in FIG. 24 or 25, the eyes of the user are lowered correspondingly, which lowers the eyelids and therefore is effective to prevent the pupils from becoming dry (dry eye).

Where the display unit 4 rests on the desk 100 as seen in FIG. 25, to a user whose eyes frequently move back and forth between the keyboard 3 and the display unit 4, particularly to a novice, the distance of back and forth movements of the eyes is minimized, and also the movement of the neck is minimized. This is effective to reduce the fatigue to the user.

Where the information processing apparatus 1 is used with the display unit 4 placed on the desk 100, the display screen 22 is normally directed obliquely forwardly upwards from the relationship of the eyes of the user. In this state, the inclined edge 23a at the lower end of the front panel 23 and the rear faces 8b and 9b of the positioning projections 8 and 9 of the keyboard 3 extend substantially parallelly as described hereinabove and as seen in FIG. 25. Consequently, the display unit 4 and the keyboard 3 provide to the user a feeling that they are unitary, and exhibit a good appearance. Further, since the ground seats 27 are provided such that they extend from the lower edges of the rear faces of the left side middle portion 24e and the right side middle portion 24f of the display unit 4 to the rear edges of the lower faces of the left side middle portion 24e and the right side middle portion 24f as described hereinabove, even when the display unit 4 is placed on the desk 100 and set to any pivoted position, the ground seats 27 always contact with the desk 100 such that the display unit 4 can be received stably on the desk 100. Besides, otherwise possible damage to the display unit 4 can be prevented.

Figure 26:
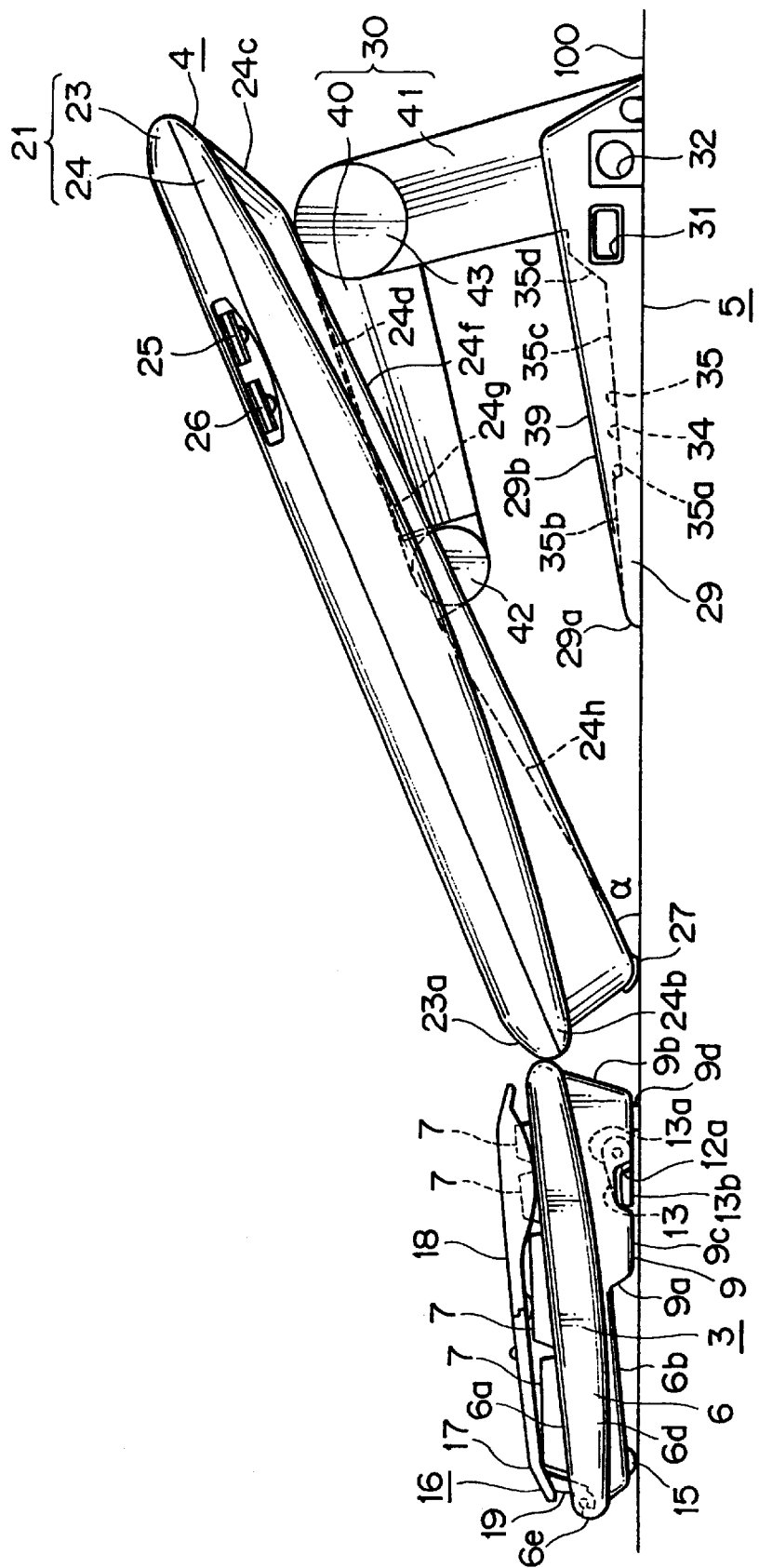
FIGS. 26 and 27 are a side elevational view and a top plan view, respectively, of the information processing apparatus of FIG. 1 in a state wherein it is used while the display unit is inclined and the operation keys of the keyboard are covered.
Figure 27:
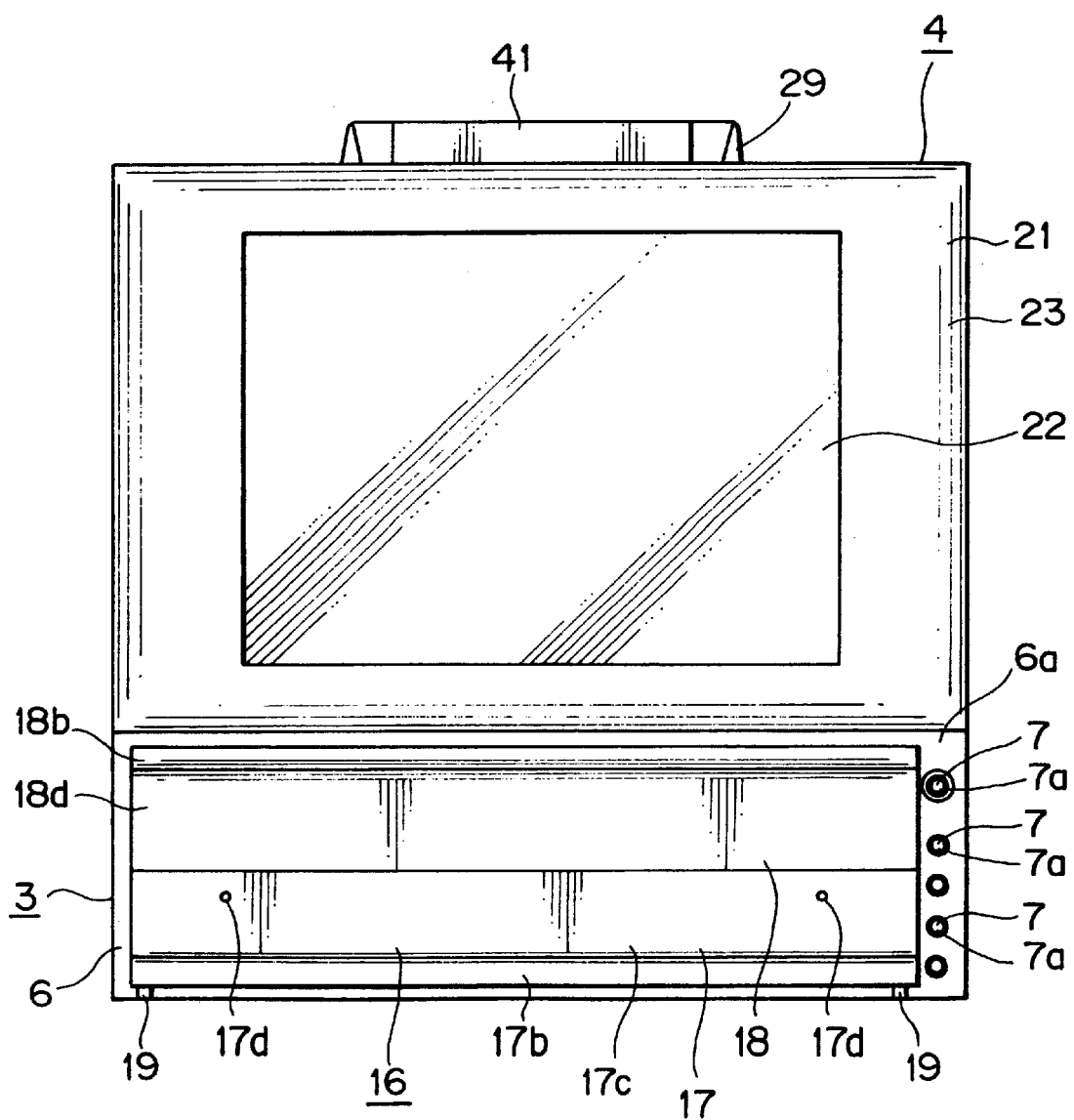

FIGS. 26 and 27 illustrate a form of use of the information processing apparatus 1 in a state wherein the display screen 22 of the display unit 4 is inclined or tilted most from the vertical position. The display unit 4 is inclined (at the inclination angle α of approximate 22°) in a state same as the state in which the accommodation space 65 described above is formed, and the ground seats 27 contact with the desk 100 and the upper inclined face 24g of the rear panel 24 contacts face-by-face with the upper arm member 40. The keyboard 3 is placed on the desk 100 in a neighboring or contacting relationship forwardly of the display unit 4, and the operation keys 7 thereof are covered with the keyboard cover 16. In this state, hand-written inputting is usually performed using the inputting pen 62 through the display screen 22. However, also it is possible to operate the hot keys 7a which are not covered with the keyboard cover 16.

When the user performs an inputting operation using the inputting pen 62, the user can place its hands or arms on the upper face of the keyboard cover 16. In this instance, the display unit 4 and the keyboard cover 16 entirely act as a hand receiving table. Accordingly, the fatigue to the arms is reduced, and consequently, the user can perform its operation easily and augmentation of the operation efficiency and augmentation of the convenience in use can be anticipated.

The upper edge of the rear end portion of the keyboard 3 is positioned in the neighborhood of or in contact with the display unit 4, and the keyboard 3 is inclined moderately forwardly downwards. The rear end edge of the keyboard cover 16 is positioned in the neighborhood of the front edge of the display unit 4, and the face of the display unit 4 on which the display screen 22 is provided and the upper face of the keyboard cover 16 are positioned in the substantially same plane. Accordingly, the display unit 4 and the keyboard 3 on which the keyboard cover 16 is supported are disposed unitarily and provide a good appearance.

Figure 28:
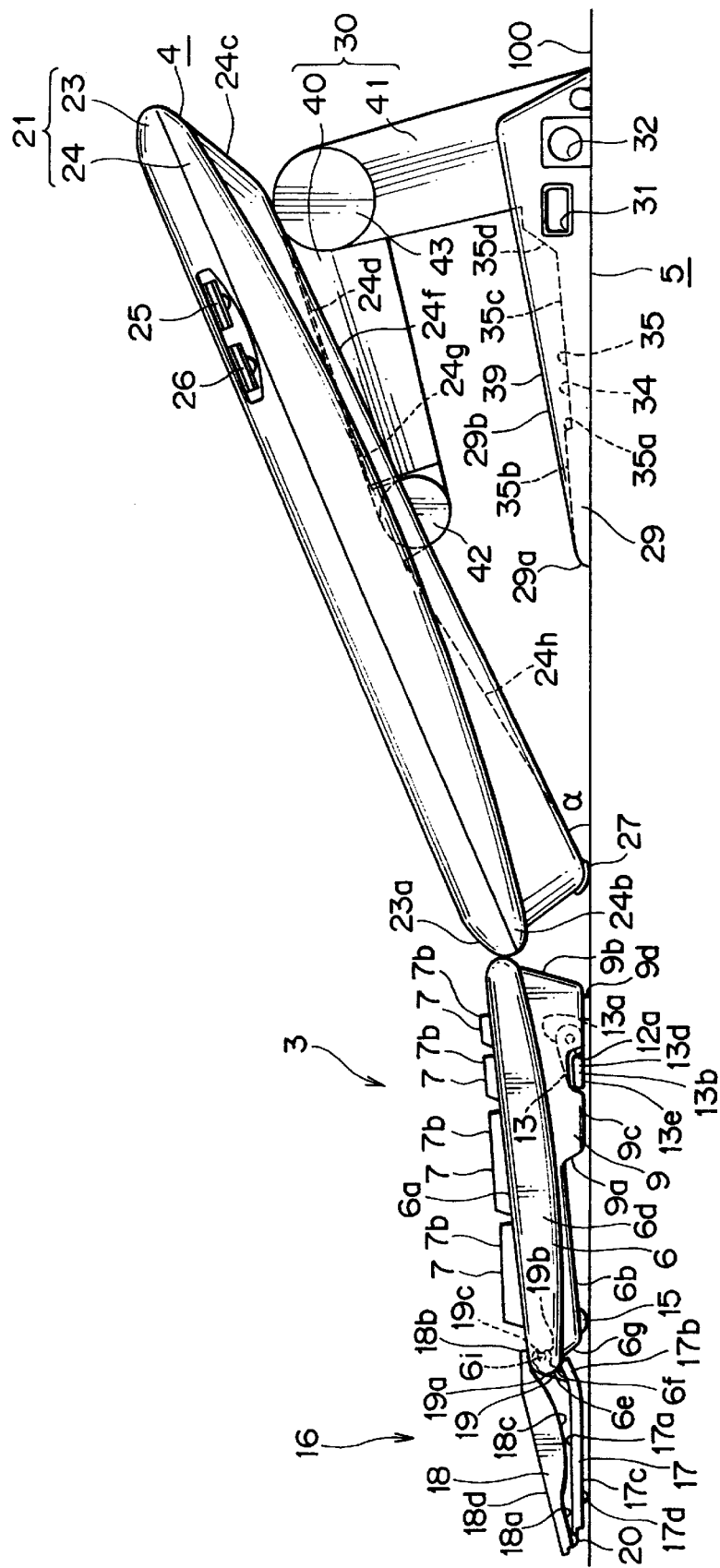
FIG. 28 is a side elevational view of the information processing apparatus of FIG. 1 when it is used while the display unit is inclined and the operation keys of the keyboard are uncovered.

Also FIG. 28 illustrates a form of use of the information processing apparatus 1 in the state wherein the display screen 22 of the display unit 4 is inclined most from the vertical position. However, different from the form of use of the information processing apparatus 1 of FIGS. 26 and 27, in the form of use of FIG. 28, the operation keys 7 are uncovered, and the keyboard cover 16 is positioned in a folded state forwardly of the keyboard 3. The display unit 4 is inclined (at the inclination angle α of approximate 22°) in a state same as the state wherein the accommodation space 65 described hereinabove is formed, and the ground seats 27 contact with the desk 100 and the upper inclined face 24g of the rear panel 24 contact face-by-face with the upper arm member 40. In this state, since the operation keys 7 are uncovered, hand-written inputting can be performed using the inputting pen 62 through the display screen 22, and besides all of the operation keys 7 can be operated. Thus, in the present form of use, both of hand-written inputting by means of he inputting pen 62 and inputting using the keyboard 3 can be used.

When the keyboard 3 is used to perform an inputting operation, the user can place its hands or arms on the outer face 18d of the second cover member 18 of the keyboard cover 16, and therefore, the keyboard cover 16 serves as a hand receiving table. Accordingly, the fatigue to the arms is reduced, and consequently, the user can perform its operation easily and augmentation of the operation efficiency and augmentation of the convenience in use can be anticipated.

The upper edge of the rear end portion of the keyboard 3 is positioned in the neighborhood of or in contact with the display unit 4, and the keyboard 3 is inclined moderately forwardly downwards. The rear end edge of the keyboard cover 16 is positioned in the neighborhood of the front edge of the display unit 4, and the face of the display unit 4 on which the display screen 22 is provided, the top wall 6a of the housing 6 of the keyboard 3 and the outer face 18d of the second cover member 18 of the keyboard cover 16 are positioned in the substantially same plane. Accordingly, the display unit 4 and the keyboard 3 on which the keyboard cover 16 is supported are disposed unitarily and provide a good appearance.

It is to be noted that, in the state wherein the display unit 4 is inclined as seen in FIG. 26 or 28, since the ground seats 27 of the display unit 4 contact with the desk 100 and the upper inclined face 24g of the rear panel 24 contact face-by-face with the upper arm member 40, the display unit 4 is disposed stably and, when a pen inputting operation is performed through the display screen 22, the display unit 4 does not play.

Now, several forms of use of the information processing apparatus 1 when the keyboard 3 is partially accommodated in the accommodation space 65 are described. In this instance, the accommodation space 65 serves also as an arrangement space in which part of the keyboard 3 is disposed.

Figure 29:
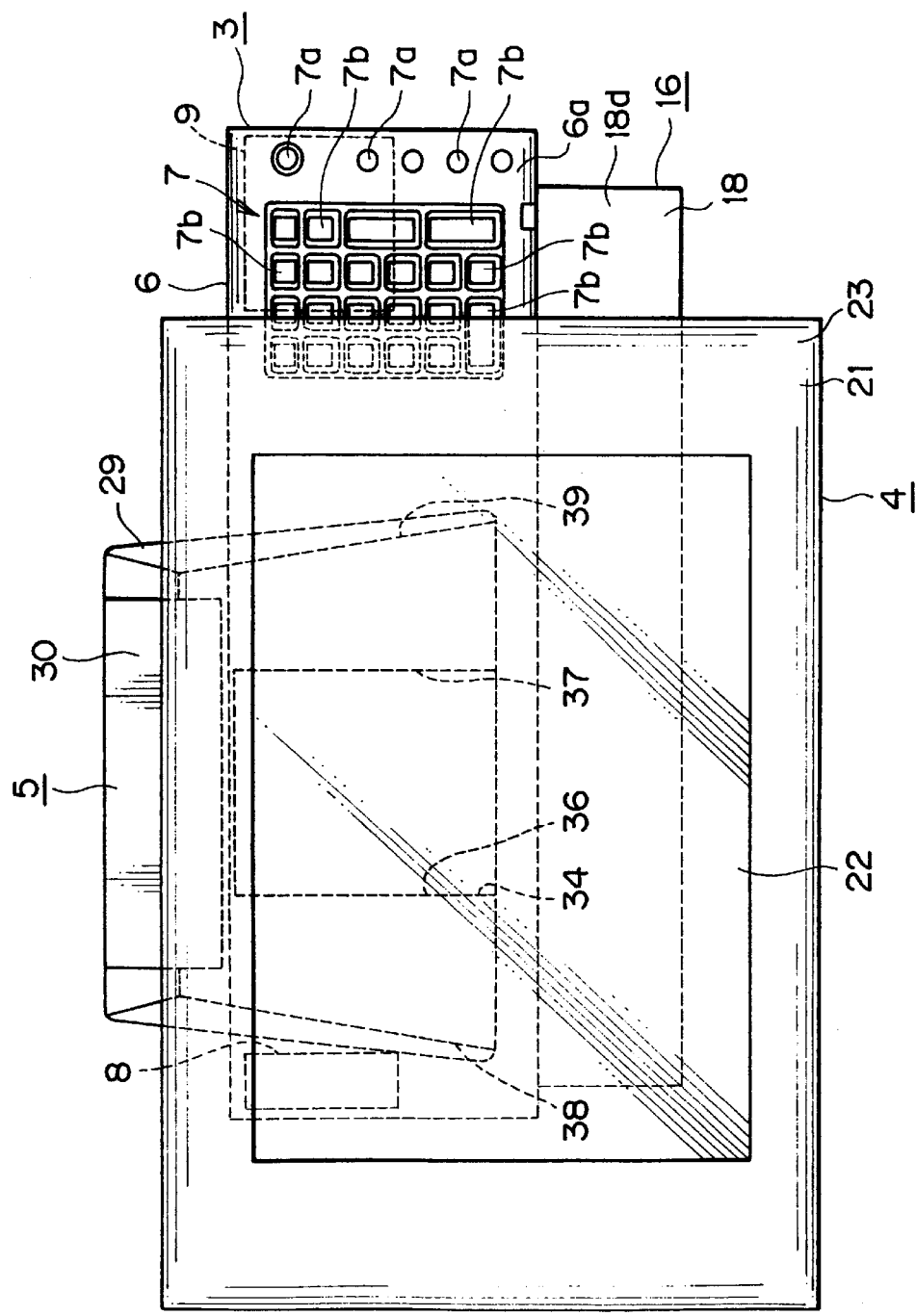
FIG. 29 is a top plan view of the information processing apparatus of FIG. 1 when it is used while a positioning projection on the left side is positioned leftwardly of the base and the keyboard partially projects rightwardly from the accommodation space.

The keyboard 3 is moved rightwardly from a position in which the keyboard 3 with the operation keys 7 uncovered is accommodated in the accommodation space 65 until the positioning projection 8 is brought into contact with the left side edge of the base 29 of the stand 5, that is, with the position restriction portion 38 and further rightward movement of the keyboard 3 is prevented by the position restriction portion 38 so that the keyboard 3 projects from the accommodation space 65 as seen in FIG. 29. In this state, all of the hot keys 7a and most of the ten keys 7b are exposed rightwardly from the accommodation space 65. Accordingly, the user can perform both of a hand-written inputting operation by means of the inputting pen 62 and an inputting operation by means of the hot keys 7a and the ten keys 7b.

Usually, when both of pen-inputting and the keyboard 3 are used, inputting of numerical values and so forth is performed in most cases using the ten keys 7b, and in most cases, the hot keys 7a are used with a high frequency. In such an instance, where the hot keys 7a and the ten keys 7b are exposed from the accommodation space 65 and used as described above, efficient operation can be performed in a necessary but minimum space, and consequently, the information processing apparatus 1 can be used with improved convenience of use.

Further, when both of pen-inputting and the keyboard 3 are used, if only those operation keys 7 which are used with a high frequency are exposed from the display unit 4 and used, then since the keyboard 3 and the display screen 22 are positioned near to the user, significant augmentation in convenience of use can be anticipated.

Furthermore, it is not necessary to provide only such operation keys as ten keys at a portion or screen frame of the display unit 4 sidewardly of the display screen 22, thereby upsizing of the display unit 4 can be prevented.

It is to be noted that, in the information processing apparatus 1, the positioning projection 9 positioned on the right side of the keyboard 3 has a great width such that, when the keyboard 3 is accommodated in the accommodation space 65, the left edge of the positioning projection 9 is positioned in contact with or in the proximity of the right side edge of the stand 5, that is, the position restriction portion 39 as seen in FIG. 21. Accordingly, even if it is tried to move the keyboard 3 leftwardly from the position wherein the keyboard 3 is accommodated in the accommodation space 65, the positioning projection 9 contacts with and is stopped by the position restriction portion 39 against such movement. Consequently, the keyboard 3 does not project leftwardly from the display unit 4.

In the information processing apparatus 1, the portion provided originally as a base seat portion on the keyboard 3 is used as the positioning projections 8 and 9 and the opposite side edges of the stand 5 are used as the position restriction portions 38 and 39 to restrict movement of the keyboard 3 in the leftward and rightward directions. Accordingly, a special positioning projection or positioning restriction element need not be provided on the keyboard 3 or the stand 5, and the keyboard 3 can be positioned in the leftward and rightward directions readily without increasing the production cost.

Figure 30:
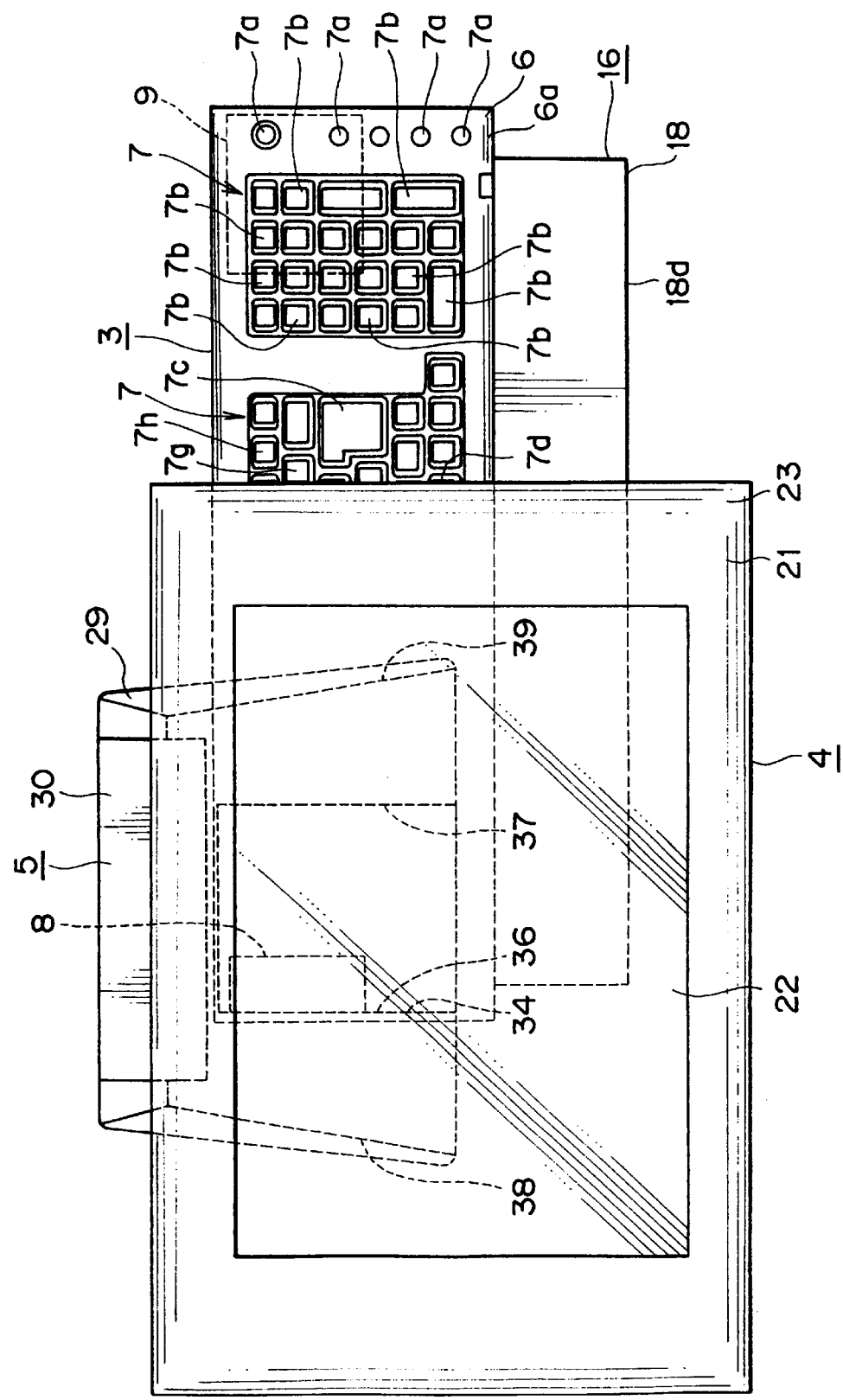
FIGS. 30 and 31 are top plan views of the information processing apparatus of FIG. 1 when it is used while the positioning projection on the left side is positioned in an insertion recess of the base and the keyboard partially projects rightwardly from the accommodation space and besides the keyboard is positioned at the left end and the right end of the range of movement thereof, respectively.
Figure 31:
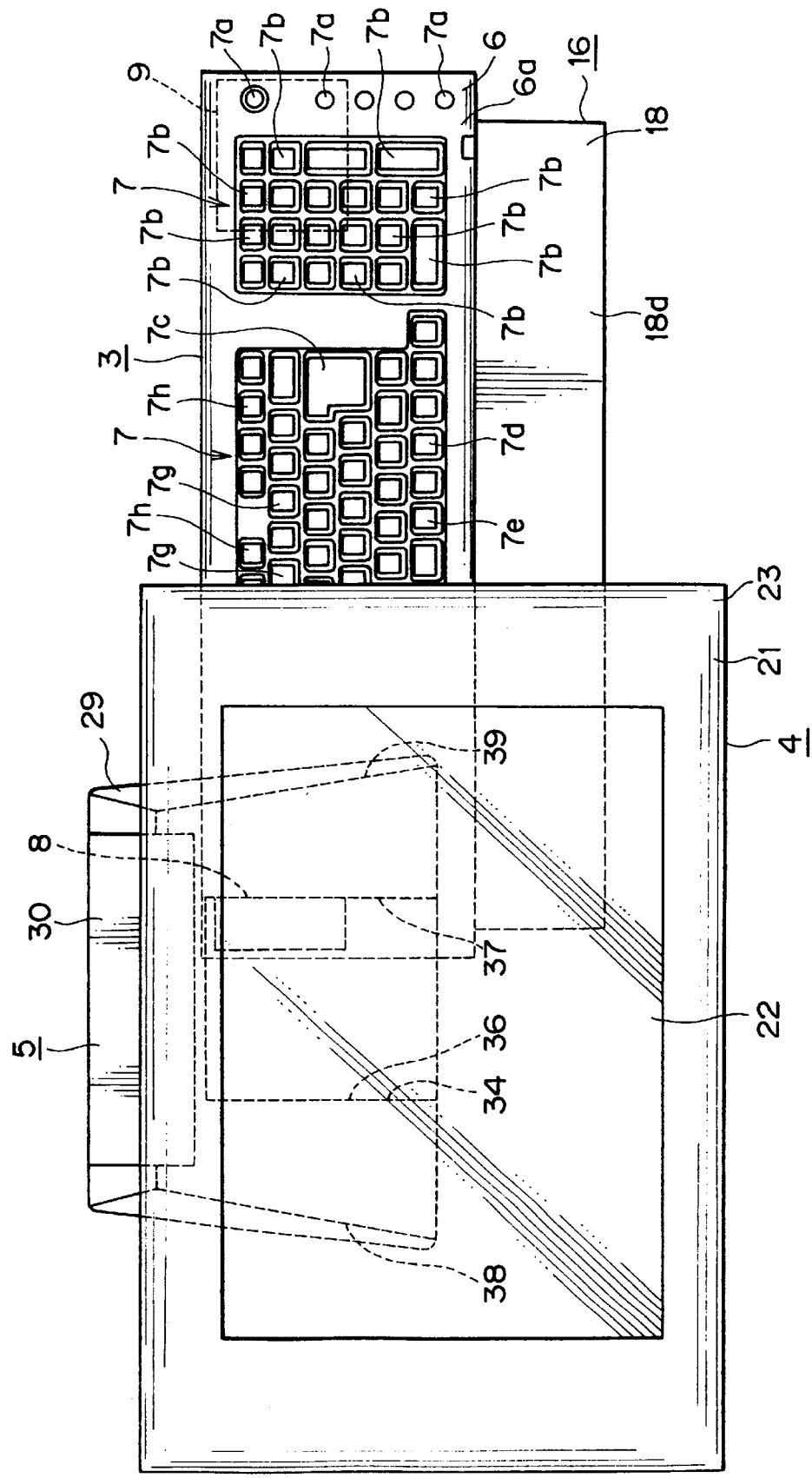

FIGS. 30 and 31 illustrate different forms of use of the information processing apparatus 1 when the operation keys 7 are uncovered and the positioning projection 8 is inserted in the deep bottom portion 35c of the insertion recess 34 of the stand 5 while the keyboard 3 is partially exposed rightwardly from the accommodation space 65.

More particularly, FIG. 30 shows the keyboard 3 positioned at the left end of the range of movement where the positioning projection 8 is disposed in the deep bottom portion 35c of the insertion recess 34. In this state, the keyboard 3 is positioned with the left edge of the positioning projection 8 contacted with the position restriction portion 36 which is the left side opening edge of the insertion recess 34, and not only the hot keys 7a and the ten keys 7b but also the enter key 7c and so forth are exposed rightwardly from the accommodation space 65. Accordingly, the user can use both of a hand-written inputting operation by means of the inputting pen 62 and an inputting operation by means of the hot keys 7a, ten keys 7b, enter key 7c and so forth. This form of use is convenient to a user such as a business user who frequently operates those operation keys 7 which are disposed at a right side portion of the keyboard 3.

FIG. 31 shows the keyboard 3 positioned at the right end of the range of movement when the positioning projection 8 is inserted in the deep bottom portion 35c of the insertion recess 34. In this state, the keyboard 3 is positioned with the right edge of the positioning projection 8 contacted with the position restriction portion 37 which is the right side opening edge of the insertion recess 34, and those operation keys 7 disposed at the further right side portion of the keyboard 3 than that in FIG. 30 are exposed rightwardly from the accommodation space 65. Also this form of use is convenient to a user such as a business user who frequently operates those operation keys 7 which are disposed at the right side portion of the keyboard 3.

Figure 32:
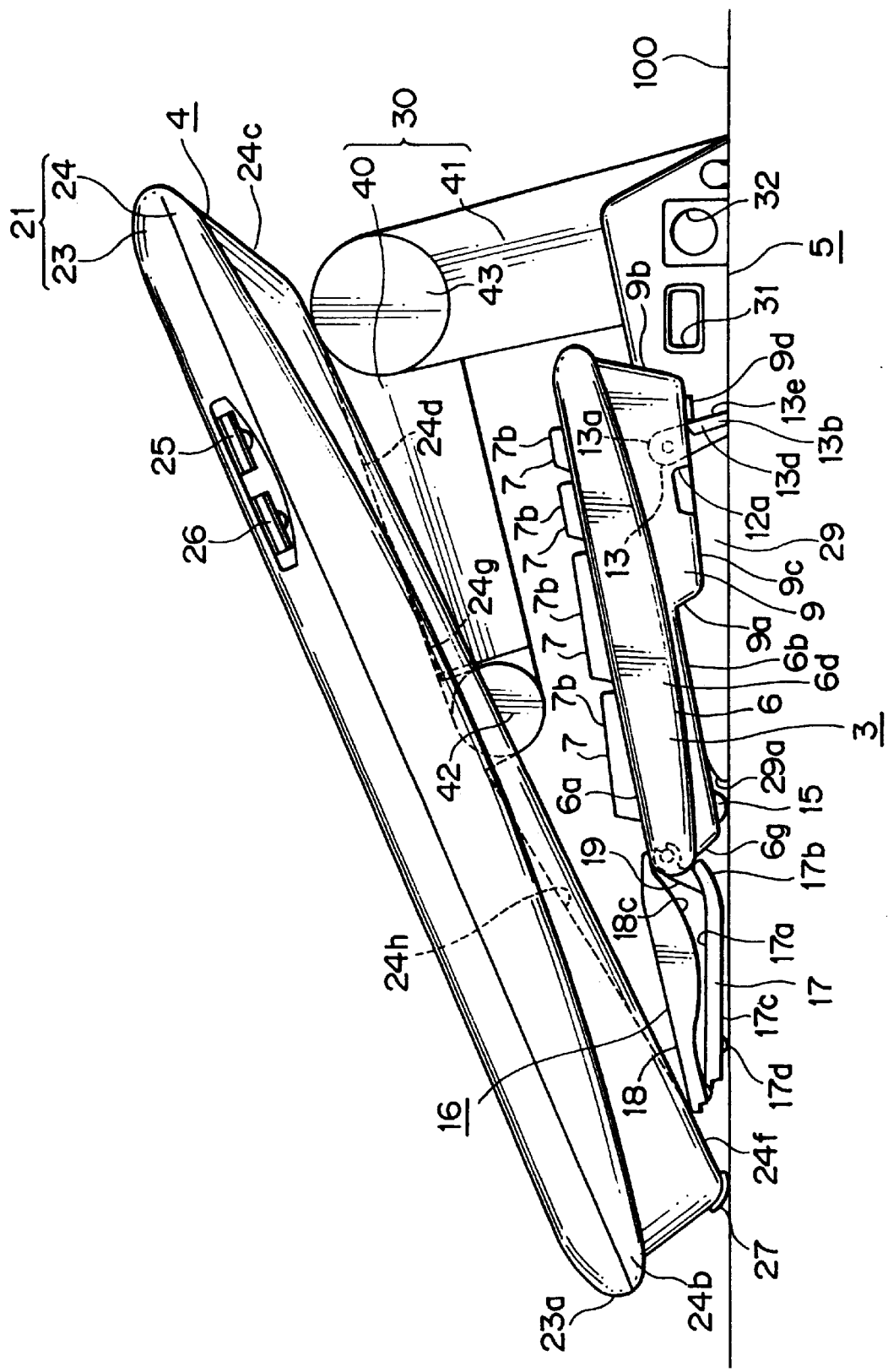
FIG. 32 is a side elevational view of the information processing apparatus of FIG. 1 when it is used while the positioning projection on the left side is positioned in the insertion recess of the base and the keyboard partially projects rightwardly from the accommodation space.

The user can position the keyboard 3 at an arbitrary position within the range of movement when the positioning projection 8 is inserted in the deep bottom portion 35c of the insertion recess 34. In order to make the keyboard 3 project rightwardly while the positioning projection 8 is inserted in the deep bottom portion 35c of the insertion recess 34 in this manner, the right side support foot 13 supported on the positioning projection 9 must be pulled out from the corresponding accommodation recess 12. If the support foot 13 is pulled out, then the positioning projection 8 on the deep bottom portion 35c of the insertion recess 34 and the support foot 13 on the desk 100 hold the keyboard 3 in a state wherein it is not inclined in the leftward and rightward directions as seen in FIG. 32.

Figure 33:
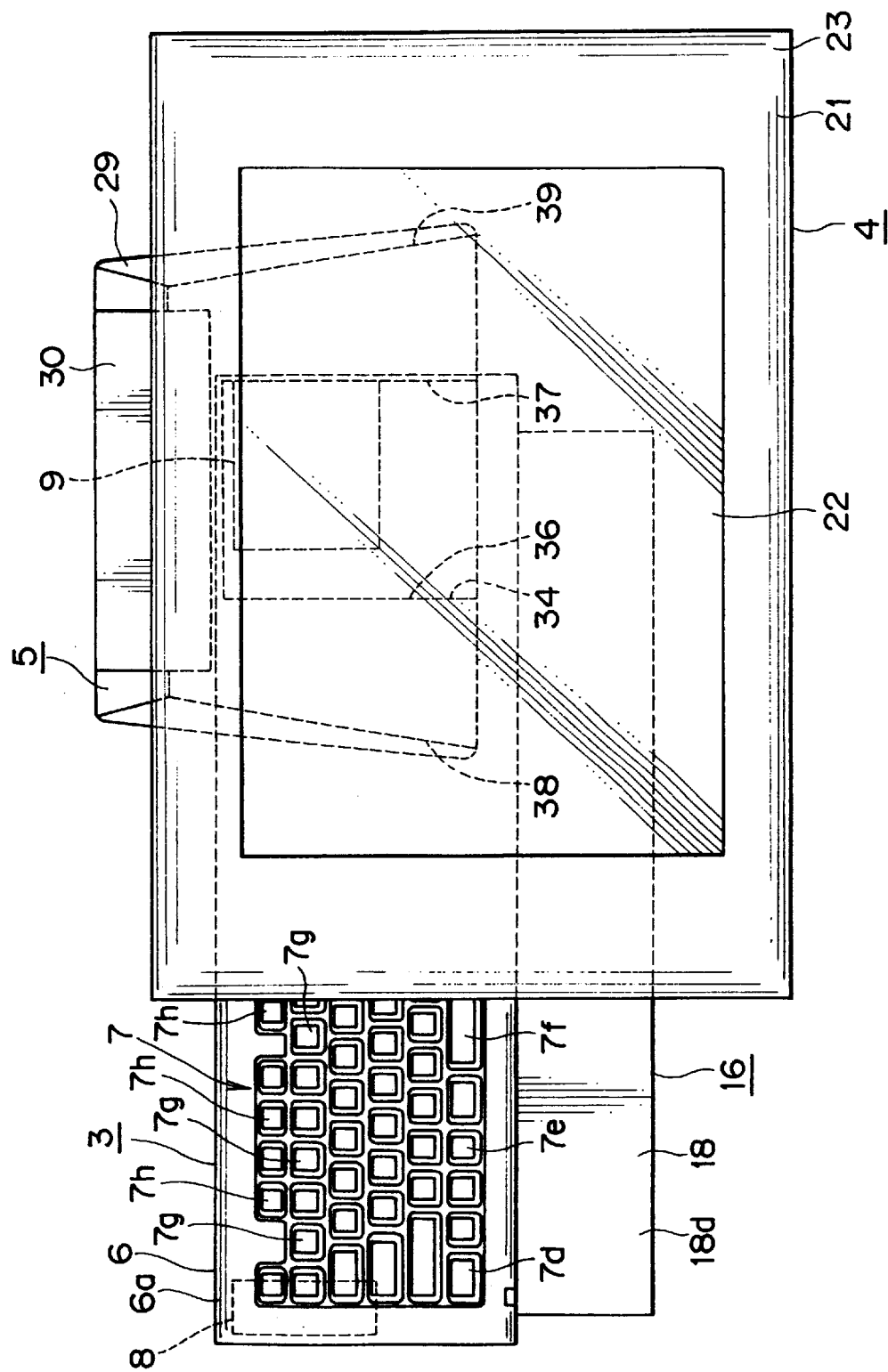
FIGS. 33 and 34 are top plan views of the information processing apparatus of FIG. 1 when it is used while a positioning projection on the right side is positioned in the insertion recess of the base and the keyboard partially projects leftwardly from the accommodation space and besides the keyboard is positioned at the right end and the left end of the range of movement thereof, respectively.
Figure 34:
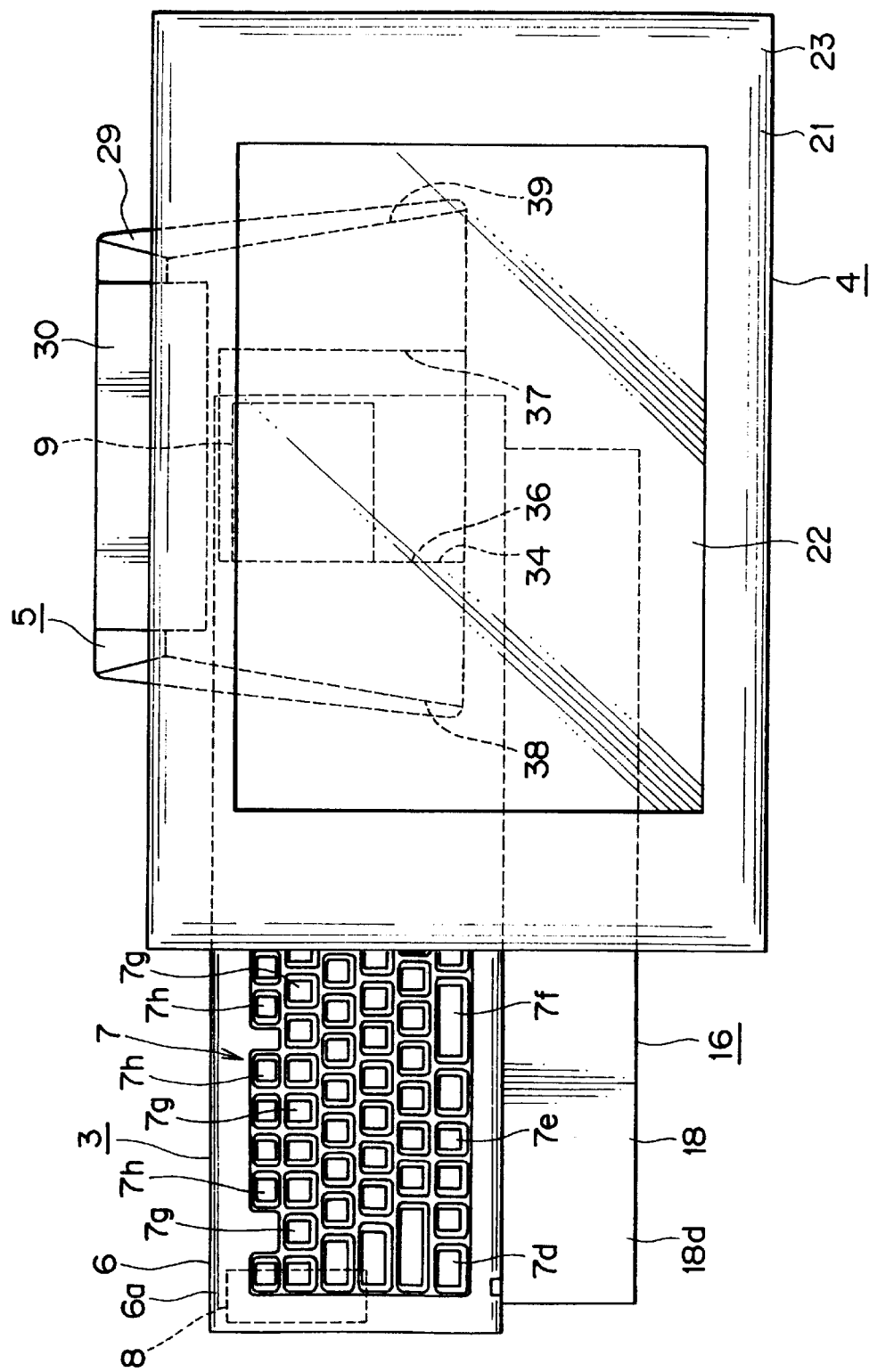

FIGS. 33 and 34 illustrate different forms of use wherein part of the keyboard 3 is exposed leftwardly from the accommodation space 65 while the operation keys 7 are uncovered and the positioning projection 9 is inserted in the deep bottom portion 35c of the insertion recess 34 of the stand 5.

More particularly, FIG. 33 shows the keyboard 3 positioned at the right end of the range of movement when the positioning projection 9 is inserted in the deep bottom portion 35c of the insertion recess 34. In this state, the keyboard 3 is positioned with the right edge of the positioning projection 9 contacted with the position restriction portion 37 of the insertion recess 34, and a control key 7d, an alt key 7e, space key 7f and so forth are exposed leftwardly from the accommodation space 65. Accordingly, the user can use both of a hand-written inputting operation by means of the inputting pen 62 and an inputting operation by means of the control key 7d, alt keys 7e, space key 7f and so forth. This form of use is convenient particularly to a user such as a creator user who frequently operates those operation keys 7 which are disposed at the left side portion of the keyboard 3.

FIG. 34 shows the keyboard 3 positioned at the left end of the range of movement when the positioning projection 9 is inserted in the deep bottom portion 35c of the insertion recess 34. In this state, the keyboard 3 is positioned with the left edge of the positioning projection 9 contacted with the position restriction portion 36 of the insertion recess 34, and those operation keys 7 disposed at the further left side portion of the keyboard 3 than that in FIG. 33 are exposed leftwardly from the accommodation space 65. Also this form of use is convenient to a user such as a creator user who frequently operates those operation keys 7 which are disposed at the left side portion of the keyboard 3.

The user can position the keyboard 3 at an arbitrary position within the range of movement when the positioning projection 9 is inserted in the deep bottom portion 35c of the insertion recess 34. In order to make the keyboard 3 project leftwardly while the positioning projection 9 is inserted in the deep bottom portion 35c of the insertion recess 34 in this manner, the left side support foot 11 supported on the positioning projection 8 must be pulled out from the corresponding accommodation recess 10. If the support foot 11 is pulled out, then the positioning projection 9 on the deep bottom portion 35c of the insertion recess 34 and the support foot 11 on the desk 100 hold the keyboard 3 in a state wherein it is not inclined in the leftward and rightward directions.

As described above, in the information processing apparatus 1, the portion provided originally as a base seat portion on the keyboard 3 is used as the positioning projections 8 and 9 and the opposite side opening edges of the insertion recess 34 are used as the position restriction portions 36 and 37 to restrict movement of the keyboard 3 in the leftward and rightward directions. Accordingly, a special positioning projection or positioning restriction element need not be provided on the keyboard 3 or the stand 5, and the keyboard 3 can be positioned in the leftward and rightward directions readily without increasing the production cost.

Further, since the positioning projections 8 and 9 are provided separately from each other at the opposite left and right end portions of the keyboard 3, both of the position at which the keyboard 3 projects rightwardly from the accommodation space 65 and the position at which the keyboard 3 projects leftwardly from the accommodation space 65 can be set, which expands the number of different forms of use of the information processing apparatus 1. Consequently, significant augmentation of the convenience of use can be anticipated.

Furthermore, when one of the positioning projection 8 and the positioning projection 9 is inserted in the deep bottom portion 35c of the insertion recess 34, if the support foot 13 or the support foot 11 is pulled out, then the keyboard 3 can be held in a state wherein it is not inclined in the leftward and rightward directions. Therefore, the state wherein the keyboard 3 is not inclined can be held very readily.

Also in the information processing apparatus 1, while the positioning projection 8 or the positioning projection 9 is inserted in the deep bottom portion 35c of the insertion recess 34, the keyboard 3 can be moved in the leftward or rightward direction so that it can be partially projected sidewardly from the accommodation space 65. Such insertion of the positioning projection 8 or the positioning projection 9 of the keyboard 3 into the deep bottom portion 35c is performed in the following manner (refer to FIGS. 35 to 37).

Figure 35:
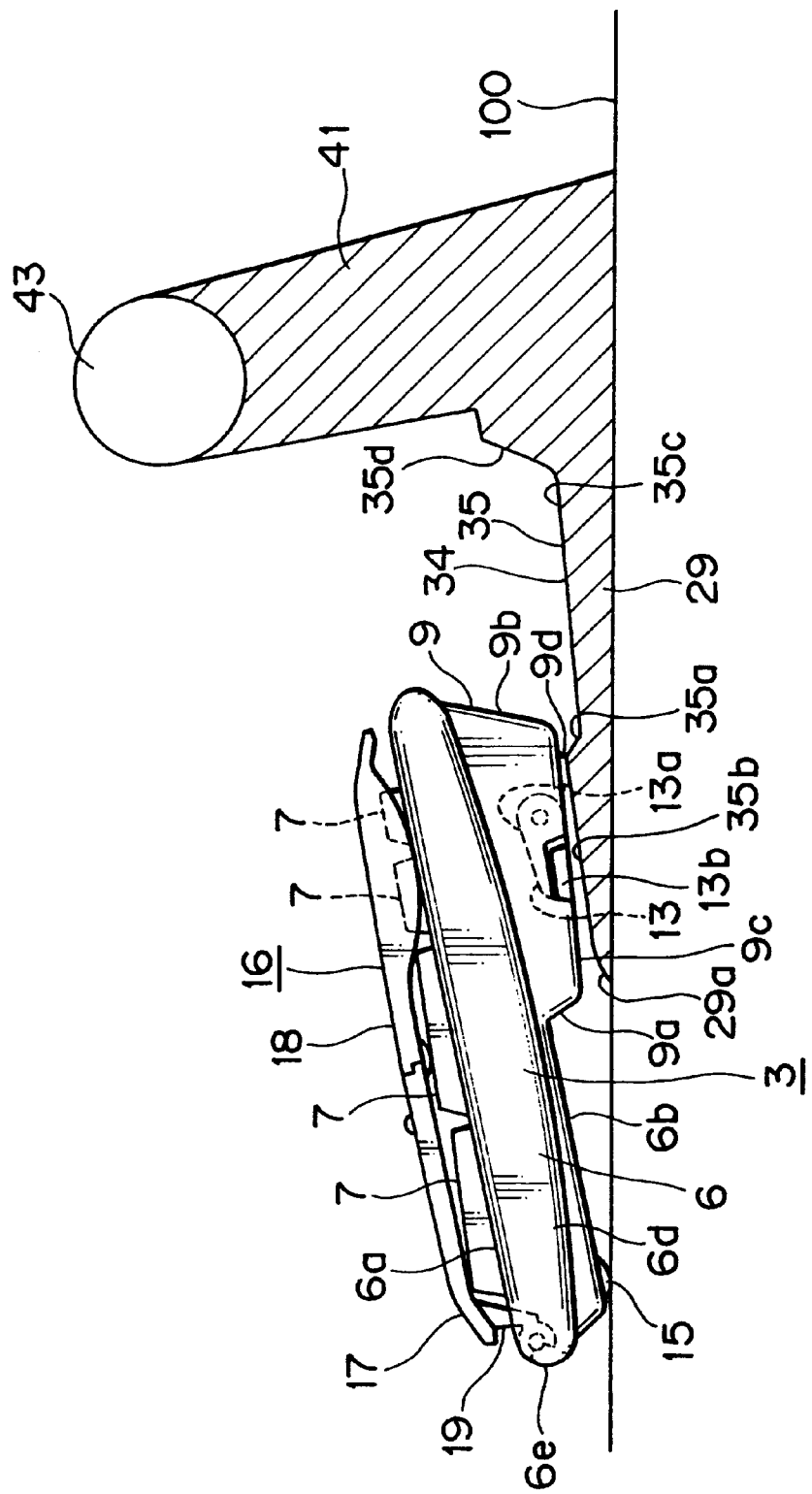
FIG. 35 is a side elevational view, partly in section, showing the information processing apparatus of FIG. 1 in a state wherein one of the positioning projections of the keyboard is inserted into the insertion recess of the base and particularly placed at a shallow portion of the insertion recess.
Figure 36:
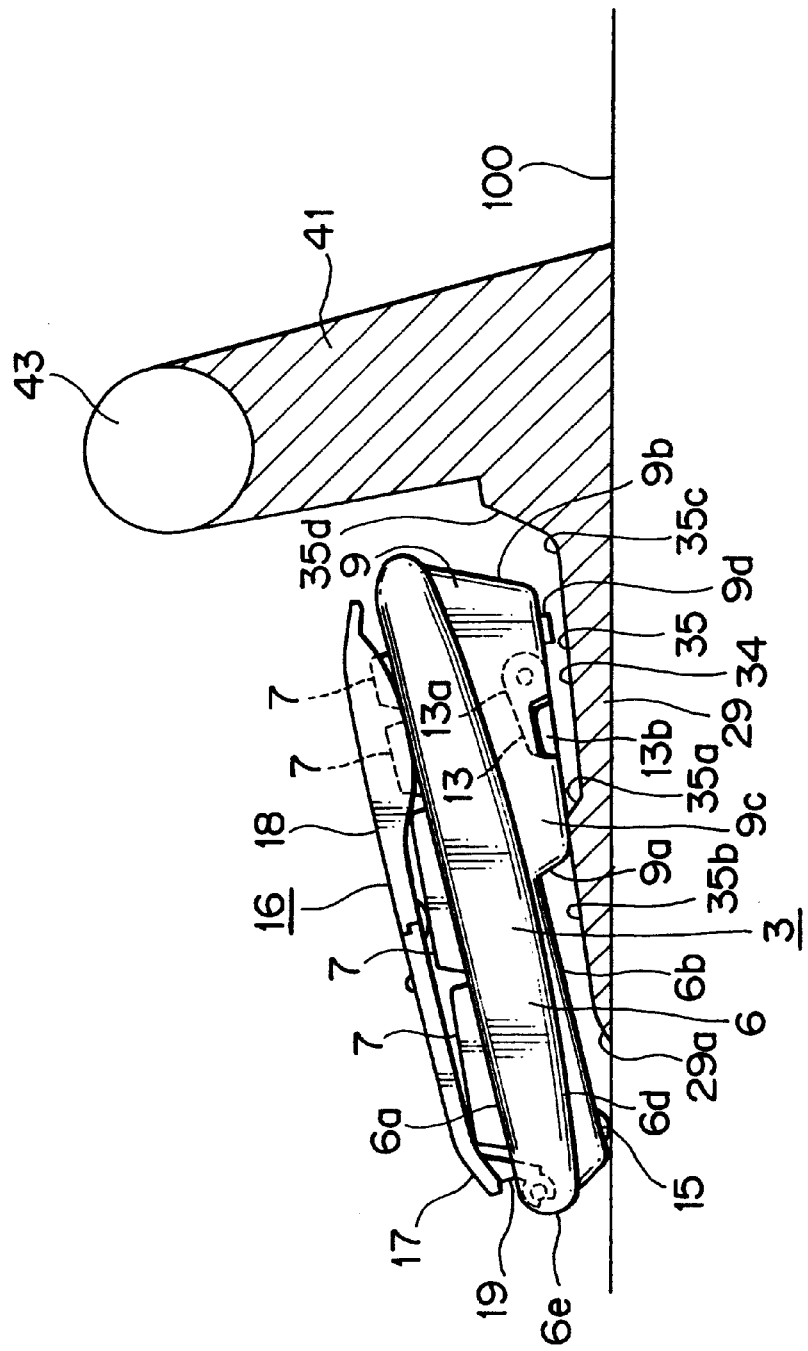
FIG. 36 is a similar view but showing the information processing apparatus of FIG. 1 in a state wherein the keyboard is positioned at a rearwardly moved position.

First, the positioning projection 8 or the positioning projection 9 is placed onto the shallow bottom portion 35b of the insertion recess 34 as seen in FIG. 35. Then, in this state, the keyboard 3 is moved rearwardly as seen in FIG. 36. While the keyboard 3 is moved rearwardly in this manner, when the front edge of the bottom face 8c of the positioning projection 8 or the front edge of the bottom face 9c of the positioning projection 9 is positioned at the offset portion 35a, the positioning projection 8 or the positioning projection 9 drops by a distance corresponding to the offset of the offset portion 35a and is inserted into the deep bottom portion 35c as seen in FIG. 37.

In this instance, since the inclination angle of the inclined face 35d contiguous rearwardly to the deep bottom portion 35c is smaller than the inclination angle of the rear faces 8b and 9b of the positioning projections 8 and 9 and the inclination angle of the offset portion 35a and the inclination angle of the front faces 8a and 9a of the positioning projections 8 and 9 are equal to each other, the positioning projection 8 or 9 is inserted smoothly into the deep bottom portion 35c.

Since the offset portion 35a and the deep bottom portion 35c are formed on the stand 5 such that, when the keyboard 3 is moved rearwardly, the positioning projection 8 or the positioning projection 9 drops by an amount corresponding to the offset between the offset portion 35a and the deep bottom portion 35c in this manner, the user can recognize from sound and vibration when the positioning projection 8 or the positioning projection 9 drops into the deep bottom portion 35c that the positioning projection 8 or the positioning projection 9 has been inserted into the deep bottom portion 35c. Accordingly, the user can recognize it with certainty depending upon the sense of hearing and the sense of sight that the positioning projection 8 or the positioning projection 9 has been inserted into the deep bottom portion 35c. Consequently, augmentation of the convenience of use can be anticipated.

If is to be noted that, while, in the foregoing description, the inputting pen 62 is used as means for performing an inputting operation without using the keyboard 3, the inputting method which does not use the keyboard 3 is not limited to the inputting pen 62. For example, a communication apparatus which can input by radio communication or the like may be used as such an inputting method as just described. Further, also it is possible to use the mouse 60 to perform inputting as described above or to perform inputting using voice.

While a preferred embodiment of the present invention has been described using specific terms, such description is for illustrative purposes only, and it is to be understood that changes and variations may be made without departing from the spirit or scope of the following claims.

What is claimed is:

1. An information processing apparatus, comprising:
   a stand including a base to be placed on a desk and a support arm extending uprightly from said base;
   a display unit having a display screen and supported for pivotal motion on said support arm of said stand; and
   a keyboard having a plurality of operation keys provided thereon;
   said support arm including an upper arm portion and a lower arm portion, said upper arm portion having an upper pivotal fulcrum at an upper end portion thereof for supporting said display unit for pivotal motion, said lower arm portion having a lower pivotal fulcrum provided at an upper end portion thereof for supporting said upper arm portion for pivotal motion;
   an accommodation space for accommodating said keyboard placed on said base being formed between said base of said stand and said display unit when said upper arm portion of said support arm is pivoted with respect to said lower arm portion around said lower pivotal fulcrum and said display unit is pivoted with respect to said upper arm portion around said upper pivotal fulcrum until said base is covered with said display unit.

2. An information processing apparatus according to claim 1, wherein a keyboard cover is supported at a front end portion of said keyboard for pivotal motion between a covering position at which said keyboard cover covers over all or some of said operation keys of said keyboard and an uncovering position at which said keyboard cover does not cover all or some of said operation keys of said keyboard, and said keyboard and said keyboard cover can be accommodated in said accommodation space when said keyboard cover is in the covering position.

3. An information processing apparatus according to claim 1, wherein a keyboard cover is supported at a front end portion of said keyboard for pivotal motion between a covering position at which said keyboard cover covers over all or some of said operation keys of said keyboard and an uncovering position at which said keyboard cover does not cover all or some of said operation keys of said keyboard, and said keyboard and said keyboard cover can be accommodated in said accommodation space when said keyboard cover is in the uncovering position.

4. An information processing apparatus according to claim 1, wherein, when said accommodation space is formed, an end portion of a face of said display unit opposite to a face on which said display screen is provided contacts with the desk and part of the face of said display unit opposite to the face on which said display screen is provided contacts face-by-face with said upper arm portion of said support arm.

5. An information processing apparatus according to claim 1, wherein, when said upper arm portion is not pivoted with respect to said lower arm portion and therefore said upper arm portion and said lower arm portion extend along a line and said display screen of said display unit is directed substantially forwardly, an accommodation space for accommodating said keyboard is formed between a lower end of said display unit and said base of said stand.

6. An information processing apparatus according to claim 1, wherein a keyboard cover is supported at a front end portion of said keyboard for pivotal motion between a covering position at which said keyboard cover covers over all or some of said operation keys of said keyboard and an uncovering position at which said keyboard cover does not cover all or some of said operation keys of said keyboard, and when said accommodation space is formed, said keyboard with said operation keys covered with said keyboard cover can be disposed in contact with or in the proximity of said display unit forwardly of said display unit, whereas, when said keyboard is disposed forwardly of said display unit, a face of said display unit on which said display screen is provided and an upper face of said keyboard cover are positioned in a substantially same plane.

7. An information processing apparatus according to claim 1, wherein a keyboard cover is supported at a front end portion of said keyboard for pivotal motion between a covering position at which said keyboard cover covers over all or some of said operation keys of said keyboard and an uncovering position at which said keyboard cover does not cover all or some of said operation keys of said keyboard, and when said accommodation space is formed, said keyboard with said operation keys uncovered can be disposed in contact with or in the proximity of said display unit forwardly of said display unit, whereas, when said keyboard with said operation keys uncovered is disposed forwardly of said display unit, a face of said display unit on which said display screen is provided, an upper face of said keyboard and an upper face of said keyboard cover are positioned in a substantially same plane.

8. An information processing apparatus according to claim 1, wherein a one-way clutch mechanism which exerts, when said upper arm portion is pivoted with respect to said lower arm portion in a direction in which said display unit is moved down, a load to the moving down force, but does not exert, when said upper arm portion is pivoted with respect to said lower arm portion in another direction in which said display unit is moved up, a load to the moving up force, is used for said lower pivotal fulcrum.

9. An information processing apparatus according to claim 1, wherein said keyboard has a positioning portion at a lower face portion thereof and is movable in a leftward and rightward direction on said base while said display unit covers over said base, and said base of said stand has a position restriction portion for being engaged, when said keyboard is moved in the leftward or rightward direction with respect to said base, by said positioning portion of said keyboard to restrict the position of said keyboard in the leftward and rightward direction.

10. An information processing apparatus according to claim 9, wherein said positioning portion of said keyboard is formed as a projection which projects from said lower face portion, and said position restriction portion of said base is formed as a recess into which said projection can be inserted.

11. An information processing apparatus according to claim 10, wherein said positioning portion is provided at each of the left and right ends of said lower end portion of said keyboard.

12. An information processing apparatus according to claim 10, wherein said recess of said base has an offset portion formed therein in such a manner as to extend in the leftward and rightward direction and is formed such that a portion of said recess rearwardly of said offset portion has a bottom shallower than a bottom of another portion of said recess which is forwardly of said offset portion.

13. An information processing apparatus according to claim 11, wherein a control circuit board for controlling a signal to be outputted upon operation of said operation keys is disposed in the inside of at least one of said positioning portions.

14. An information processing apparatus according to claim 11, wherein an accommodation recess is formed in each of said positioning portions on the opposite sides of said keyboard, and a support foot for being accommodated into said accommodation recess is supported for pivotal motion on each of said positioning portions, said keyboard being held in a horizontal state in the leftward and rightward direction by pulling out, while one of said positioning portions is inserted in said recess of said position restriction portion, said support foot from said accommodation recess provided on the other one of said positioning portions and erecting said support foot on the desk.

* * * * *